US008224908B2

(12) United States Patent
Tanaka

(10) Patent No.: US 8,224,908 B2
(45) Date of Patent: Jul. 17, 2012

(54) INFORMATION PROCESSING SYSTEM, E-MAIL TRANSMISSION CONTROL APPARATUS, INFORMATION PROCESSING METHOD AND PROGRAM

(75) Inventor: Yasuhiro Tanaka, Ikeda (JP)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 12/336,470

(22) Filed: Dec. 16, 2008

(65) Prior Publication Data

US 2009/0172121 A1    Jul. 2, 2009

(30) Foreign Application Priority Data

Dec. 28, 2007  (JP) ................................. 2007-340419

(51) Int. Cl.
  *G06F 15/16*  (2006.01)
(52) U.S. Cl. ......................................................... 709/206
(58) Field of Classification Search .................... 705/26, 705/50; 709/203, 206; 715/751; 713/151
  See application file for complete search history.

(56) References Cited

U.S. PATENT DOCUMENTS

| | | | |
|---|---|---|---|
| 5,850,219 A * | 12/1998 | Kumomura | 715/751 |
| 6,289,427 B1 | 9/2001 | Tanaka | |
| 7,333,956 B2 * | 2/2008 | Malcolm | 705/50 |
| 7,359,936 B2 * | 4/2008 | Gruen et al. | 709/203 |
| 7,454,369 B2 * | 11/2008 | Cirulli et al. | 705/26 |
| 2003/0074277 A1 * | 4/2003 | Foutz | 705/26 |
| 2008/0307057 A1 * | 12/2008 | Prentiss, Jr. | 709/206 |
| 2009/0044006 A1 * | 2/2009 | Shim et al. | 713/151 |

FOREIGN PATENT DOCUMENTS

| | | |
|---|---|---|
| JP | 5-191448 | 7/1993 |
| JP | 7-193595 | 7/1995 |
| JP | 7-230415 | 8/1995 |
| JP | 11-298520 | 10/1999 |
| JP | 2002-024499 | 1/2002 |
| JP | 2002-063117 | 2/2002 |
| JP | 2002-108789 | 4/2002 |
| JP | 2004-199609 | 7/2004 |
| JP | 2005-011176 | 1/2005 |
| JP | 2005-056092 | 3/2005 |
| JP | 2006-127318 | 5/2006 |
| JP | 2007-065787 | 3/2007 |
| WO | 2006-059383 | 6/2006 |

* cited by examiner

*Primary Examiner* — Dustin Nguyen
(74) *Attorney, Agent, or Firm* — Fitzpatrick, Cella, Harper & Scinto

(57) ABSTRACT

In an information processing system which includes a transmitter terminal and an E-mail transmission control apparatus, the transmitter terminal sets an application classification of an E-mail to be transmitted, and transmits the E-mail to which the set application classification has been added, to the E-mail transmission control apparatus. Further, the E-mail transmission control apparatus receives the E-mail to which the application classification has been added, from the transmitter terminal, identifies, from approval request information in which the application classification and an approval request destination are made corresponding to each other, the approval request destination corresponding to the application classification added to the received E-mail, and transmits an approval request to the identified approval request destination.

8 Claims, 19 Drawing Sheets

| NAME | GROUP 1 | GROUP 2 | GROUP 3 | MAIL ADDRESS |
|---|---|---|---|---|
| ABE | NORTH AMERICA PROJECT DIVISION | | | abe@deko.jp |
| ASOU | NORTH AMERICA PROJECT DIVISION | | | asou@deko.jp |
| NAKAMURA | NORTH AMERICA PROJECT DIVISION | DEVELOPMENT DEPARTMENT | | nakamura@deko.jp |
| TAKAHARA | NORTH AMERICA PROJECT DIVISION | DEVELOPMENT DEPARTMENT | | takahara@deko.jp |
| INAMOTO | NORTH AMERICA PROJECT DIVISION | DEVELOPMENT DEPARTMENT | 1ST SECTION | inamoto@deko.jp |
| KAWAGUCHI | NORTH AMERICA PROJECT DIVISION | DEVELOPMENT DEPARTMENT | 1ST SECTION | kawaguchi@deko.jp |
| NAKAZAWA | NORTH AMERICA PROJECT DIVISION | DEVELOPMENT DEPARTMENT | 1ST SECTION | nakazawa@deko.jp |
| ENDO | NORTH AMERICA PROJECT DIVISION | DEVELOPMENT DEPARTMENT | 2ND SECTION | endo@deko.jp |
| MIZUNO | NORTH AMERICA PROJECT DIVISION | DEVELOPMENT DEPARTMENT | 2ND SECTION | mizuno@deko.jp |
| HONDA | NORTH AMERICA PROJECT DIVISION | DEVELOPMENT DEPARTMENT | 2ND SECTION | honda@deko.jp |
| SUZUKI | NORTH AMERICA PROJECT DIVISION | SALES DEPARTMENT | | suzuki@deko.jp |
| MATSUI | NORTH AMERICA PROJECT DIVISION | SALES DEPARTMENT | | matsui@deko.jp |
| TAGUCHI | NORTH AMERICA PROJECT DIVISION | SALES DEPARTMENT | 1ST SECTION | taguchi@deko.jp |
| MATSUZAKA | NORTH AMERICA PROJECT DIVISION | SALES DEPARTMENT | 1ST SECTION | matsuzaka@deko.jp |
| OKAJIMA | NORTH AMERICA PROJECT DIVISION | SALES DEPARTMENT | 1ST SECTION | okajima@deko.jp |
| IWAMURA | NORTH AMERICA PROJECT DIVISION | SALES DEPARTMENT | 2ND SECTION | iwamura@deko.jp |
| KUWATA | NORTH AMERICA PROJECT DIVISION | SALES DEPARTMENT | 2ND SECTION | kuwata@deko.jp |
| IGAWA | NORTH AMERICA PROJECT DIVISION | SALES DEPARTMENT | 2ND SECTION | ikawa@deko.jp |

| NAME | POST |
|---|---|
| ABE | NORTH AMERICA PROJECT DIVISION, PROJECT DIVISION MANAGER |
| ASOU | NORTH AMERICA PROJECT DIVISION, PROJECT DIVISION VICE-MANAGER |
| NAKAMURA | NORTH AMERICA PROJECT DIVISION, DEVELOPMENT DEPARTMENT, DEPARTMENT MANAGER |
| TAKAHARA | NORTH AMERICA PROJECT DIVISION, DEVELOPMENT DEPARTMENT, DEPARTMENT VICE-MANAGER |
| INAMOTO | NORTH AMERICA PROJECT DIVISION, DEVELOPMENT DEPARTMENT, 1ST SECTION, SECTION MANAGER |
| ENDO | NORTH AMERICA PROJECT DIVISION, DEVELOPMENT DEPARTMENT, 2ND SECTION, SECTION MANAGER |
| SUZUKI | NORTH AMERICA PROJECT DIVISION, SALES DEPARTMENT, DEPARTMENT MANAGER |
| MATSUI | NORTH AMERICA PROJECT DIVISION, SALES DEPARTMENT, DEPARTMENT VICE-MANAGER |
| TAGUCHI | NORTH AMERICA PROJECT DIVISION, SALES DEPARTMENT, 1ST SECTION, SECTION MANAGER |
| IWAMURA | NORTH AMERICA PROJECT DIVISION, SALES DEPARTMENT, 2ND SECTION, SECTION MANAGER |

| APPROVAL ID | TARGET OF APPROVAL | APPLICATION CLASSIFICATION |
|---|---|---|
| 1 | NORTH AMERICA PROJECT DIVISION | CONTRACT |
| 2 | NORTH AMERICA PROJECT DIVISION, DEVELOPMENT DEPARTMENT | ESTIMATE REQUEST |
| 3 | NORTH AMERICA PROJECT DIVISION, DEVELOPMENT DEPARTMENT, 1ST SECTION | DEMAND SPECIFICATION |
| 4 | NORTH AMERICA PROJECT DIVISION, DEVELOPMENT DEPARTMENT, 1ST SECTION | FUNCTION SPECIFICATION |
| 5 | NORTH AMERICA PROJECT DIVISION, DEVELOPMENT DEPARTMENT, 1ST SECTION | TEST REPORT |
| 6 | NORTH AMERICA PROJECT DIVISION, DEVELOPMENT DEPARTMENT, 1ST SECTION | PROBLEM REPORT |
| 7 | NORTH AMERICA PROJECT DIVISION, DEVELOPMENT DEPARTMENT, 2ND SECTION | DEMAND SPECIFICATION |
| 8 | NORTH AMERICA PROJECT DIVISION, DEVELOPMENT DEPARTMENT, 2ND SECTION | FUNCTION SPECIFICATION |
| 9 | NORTH AMERICA PROJECT DIVISION, DEVELOPMENT DEPARTMENT, 2ND SECTION | TEST REPORT |
| 10 | NORTH AMERICA PROJECT DIVISION, DEVELOPMENT DEPARTMENT, 2ND SECTION | PROBLEM REPORT |
| 11 | NORTH AMERICA PROJECT DIVISION, SALES DEPARTMENT | CONTRACT |
| 12 | NORTH AMERICA PROJECT DIVISION, SALES DEPARTMENT, 1ST SECTION | ESTIMATE (< 1,000,000 YEN) |
| 13 | NORTH AMERICA PROJECT DIVISION, SALES DEPARTMENT, 1ST SECTION | ESTIMATE (≥ 1,000,000 YEN) |
| 14 | NORTH AMERICA PROJECT DIVISION, SALES DEPARTMENT, 1ST SECTION | BILL |
| 15 | NORTH AMERICA PROJECT DIVISION, SALES DEPARTMENT, 1ST SECTION | STATEMENT OF DELIVERY |
| 16 | NORTH AMERICA PROJECT DIVISION, SALES DEPARTMENT, 2ND SECTION | ESTIMATE (< 1,000,000 YEN) |
| 17 | NORTH AMERICA PROJECT DIVISION, SALES DEPARTMENT, 2ND SECTION | ESTIMATE (≥ 1,000,000 YEN) |
| 18 | NORTH AMERICA PROJECT DIVISION, SALES DEPARTMENT, 2ND SECTION | BILL |
| 19 | NORTH AMERICA PROJECT DIVISION, SALES DEPARTMENT, 2ND SECTION | STATEMENT OF DELIVERY |

| APPROVAL ID | ORDER | APPROVER |
|---|---|---|
| ⋮ | ⋮ | ⋮ |
| 17 | 1 | IWAMURA (SECTION MANAGER) |
| 17 | 2 | ENDO (SECTION MANAGER) |
| 18 | 1 | IWAMURA (SECTION MANAGER) |
| 19 | 1 | IWAMURA (SECTION MANAGER) |
| ⋮ | ⋮ | ⋮ |

}1301 (bracketing rows for approval ID 17)

FIG. 11

Subject: TRANSMISSION OF ESTIMATE  } 601
From: kuwata@deko.jp
To: marui@marubatu.jp  } 602
X-MailPurpose: ESTIMATE (≧1,000,000 YEN)

○×INC.  } 603
MARUI ESQ.
. .

| APPROVAL ID | ORDER | APPROVER |
|---|---|---|
| .. | .. | .. |
| 17 | 1 | NORTH AMERICA PROJECT DIVISION, SALES DEPARTMENT, 2ND SECTION, SECTION MANAGER |
| 17 | 2 | NORTH AMERICA PROJECT DIVISION, DEVELOPMENT DEPARTMENT, 2ND SECTION, SECTION MANAGER |
| 18 | 1 | NORTH AMERICA PROJECT DIVISION, SALES DEPARTMENT, 2ND SECTION, SECTION MANAGER |
| 19 | 1 | NORTH AMERICA PROJECT DIVISION, SALES DEPARTMENT, 2ND SECTION, SECTION MANAGER |
| .. | .. | .. |

1401 (bracket over APPROVER column rows)

FIG. 13

APPLICATION LIST

LIST OF WAITING FOR APPROVAL {IWAMURA (SECTION MANAGER)}

| TRANSMITTER | DESTINATION | CLASSIFICATION | SUBJECT | STATUS |
|---|---|---|---|---|
| kuwata@deko.jp | marui@marubatu.jp | ESTIMATE (< 1,000,000 YEN) | ESTIMATE | WAITING FOR APPROVAL |
| kuwata@deko.jp | yamamoto@maruba... | CONTRACT | CONTRACT IS SENT ... | REJECTED |
| kuwata@deko.jp | iida@marubatu.jp | BILL | BILL IS SENT ... | WAITING FOR APPROVAL |
| kuwata@deko.jp | tatunami@marubat... | ESTIMATE (≥ 1,000,000 YEN) | SENDING OF ESTIMATE | WAITING FOR APPROVAL |
| igawa@deko.jp | marui@marubatu.jp | STATEMENT OF DELIVERY | SENDING OF STATEMENT OF DELIVERY | WAITING FOR APPROVAL |
| igawa@deko.jp | marui@marubatu.jp | STATEMENT OF DELIVERY | SENDING OF STATEMENT OF DELIVERY | WAITING FOR APPROVAL |

APPROVE   REJECT   DETAIL...   CLOSE

FIG. 16
940

| APPROVAL ID | ORDER | APPROVER | RELATION |
|---|---|---|---|
| :. | :. | :. | :. |
| 17 | 1 | IWAMURA (SECTION MANAGER), SUZUKI (DEPARTMENT MANAGER) | AND ~1601 |
| 17 | 2 | ABE (PROJECT DIVISION MANAGER), ASOU (PROJECT DIVISION VICE-MANAGER) | OR ~1602 |
| 17 | 3 | ENDO (SECTION MANAGER) | — ~1603 |
| 18 | 1 | IWAMURA (SECTION MANAGER) | — |
| 19 | 1 | IWAMURA (SECTION MANAGER) | — |
| :. | :. | :. | :. |

FIG. 17
940

| APPROVAL ID | ORDER | APPROVER | RELATION | APPROVAL OPERATION | HOLDING TIME |
|---|---|---|---|---|---|
| :. | :. | :. | :. | :. | :. |
| 17 | 1 | IWAMURA (SECTION MANAGER) | — | HOLDING | — ~1801 |
| 17 | 2 | SUZUKI (DEPARTMENT MANAGER) | — | TEMPORARY HOLDING | 1 HOUR ~1802 |
| 17 | 3 | ENDO (SECTION MANAGER) | — | COPY SENDING | — ~1803 |
| 18 | 1 | IWAMURA (SECTION MANAGER) | — | HOLDING | — |
| 19 | 1 | IWAMURA (SECTION MANAGER) | — | HOLDING | — |
| :. | :. | :. | :. | :. | :. |

950

| LOCATION | APPLICATION CLASSIFICATION CHARACTER STRING (OR PATTERN) | APPLICATION CLASSIFICATION |
|---|---|---|
| ATTACHED FILE NAME | BILL | BILL |
| ATTACHED FILE NAME | CONTRACT | CONTRACT |
| IN ATTACHED FILE | BILL | BILL |
| [ESTIMATION AMOUNT] * | [0-9]., [0-9]... | ESTIMATE (≥1,000,000 YEN) |
| [ESTIMATION AMOUNT] * | [^0-9],[0-9]..,[0-9]..,[^0-9]. | ESTIMATE (<1,000,000 YEN) |

2001
2002
2003

WARNING SCREEN | ×

WARNING

THERE ARE PLURAL DIFFERENT
APPLICATION CLASSIFICATIONS

| APPROVAL CLASSIFICATION | APPROVAL REQUEST DESTINATION (APPROVER) | ORDER (APPROVAL ORDER) |
|---|---|---|
| CONTRACT | IWAMURA (SECTION MANAGER) | 1 |
| CONTRACT | ENDO (SECTION MANAGER) | 2 |
| ESTIMATE REQUEST | ENDO (SECTION MANAGER) | 1 |

| E-MAIL ADDRESS OF TRANSMISSION SOURCE | APPROVAL CLASSIFICATION | APPROVAL REQUEST DESTINATION (APPROVER) | ORDER (APPROVAL ORDER) | APPROVAL OPERATION | HOLDING TIME |
|---|---|---|---|---|---|
| tanaka@***.co.jp | CONTRACT | IWAMURA (SECTION MANAGER) | 1 | HOLDING | — |
| tanaka@***.co.jp | CONTRACT | ENDO (SECTION MANAGER) | 2 | HOLDING | — |
| ogata@***.co.jp | ESTIMATE REQUEST | ENDO (SECTION MANAGER) | 1 | TEMPORARY HOLDING | 1 HOUR |

INFORMATION PROCESSING SYSTEM, E-MAIL TRANSMISSION CONTROL APPARATUS, INFORMATION PROCESSING METHOD AND PROGRAM

BACKGROUND OF THE INVENTION

1. Field of the Invention

The present invention relates to an information processing system, an E-mail transmission control apparatus, an information processing method, and a program capable of achieving the information processing method.

2. Description of the Related Art

In recent years, importance of internal control has increased according to legislation and the like. In this connection, it is desirable in E-mail transmission to go through a prescribed procedure from the aspect of internal control. However, there is a problem in the E-mail transmission that, even if the contents of an E-mail are approved beforehand, it is impossible to confirm the contents of the E-mail to be actually transmitted.

Here, each of Japanese Patent Application Laid-Open Nos. 2002-063117 and 2007-065787 discloses an E-mail transmission/reception apparatus in which a transmitter designates an approver in regard to an E-mail to be actually transmitted. According to the techniques disclosed in these documents, it is possible to cope with the above problem if the approver designated by the transmitter confirms the content of the E-mail to be actually transmitted.

Further, according to the technique disclosed in Japanese Patent Application Laid-Open No. 2007-065787, since the selectable approvers are limited according to the transmitter, it is possible to prevent that an obviously improper approver approves the content of the E-mail.

However, from the aspect of internal control, it is assumed that different approval methods are prescribed according to the contents of the E-mails to be transmitted. Under the circumstances, in the techniques disclosed in Japanese Patent Application Laid-Open Nos. 2002-063117 and 2007-065787, the prescribed approver has to be judged by the transmitter according to the content to be transmitted. For this reason, there is a problem that, if there are many approval methods, transmitter's judgments for selecting the approvers become complicated.

Further, in a case where an organization, an approval method or the like is changed, there is a possibility that the transmitter of an E-mail requests the approval to an improper destination because it is impossible to completely inform all the transmitters of such a change.

It should be noted that the present invention has been completed in consideration of such conventional problems as described above, and aims to obviate necessity for complicated judgment by an E-mail transmitter for selecting an approver, and further aims to prevent an approval request by the E-mail transmitter issued to an improper destination.

SUMMARY OF THE INVENTION

The present invention provides a communication apparatus and a control method thereof, which overcome the above-described conventional problems.

To achieve such objects, according to one aspect of the present invention, there is provided an information processing system which includes a transmitter terminal and an E-mail transmission control apparatus, wherein: the transmitter terminal comprises a setting unit configured to set an application classification of an E-mail to be transmitted, and a transmission unit configured to transmit the E-mail to which the application classification set by the setting unit has been added, to the E-mail transmission control apparatus; and the E-mail transmission control apparatus comprises a reception unit configured to receive the E-mail to which the application classification has been added, from the transmitter terminal, an identifying unit configured to identify, from approval request information in which the application classification and an approval request destination are made corresponding to each other, the approval request destination corresponding to the application classification added to the E-mail received by the reception unit, and an approval request transmission unit configured to transmit an approval request to the approval request destination identified by the identifying unit.

According to another aspect of the present invention, there is provided an E-mail transmission control apparatus comprising: a reception unit configured to receive, from a transmitter terminal, an E-mail to which an application classification has been added; an identifying unit configured to identify, from approval request information in which the application classification and an approval request destination are made corresponding to each other, the approval request destination corresponding to the application classification added to the E-mail received by the reception unit; and an approval request transmission unit configured to transmit an approval request to the approval request destination identified by the identifying unit.

According to still another aspect of the present invention, there is provided an information processing method in an information processing system which includes a transmitter terminal and an E-mail transmission control apparatus, wherein: in the transmitter terminal, the information processing method comprising setting an application classification of an E-mail to be transmitted, and transmitting the E-mail to which the set application classification has been added, to the E-mail transmission control apparatus; and in the E-mail transmission control apparatus, the information processing method comprising receiving the E-mail to which the application classification has been added, from the transmitter terminal, identifying, from approval request information in which the application classification and an approval request destination are made corresponding to each other, the approval request destination corresponding to the application classification added to the received E-mail, and transmitting an approval request to the identified approval request destination.

According to still another aspect of the present invention, there is provided an information processing method in an E-mail transmission control apparatus, the method comprising: receiving an E-mail to which an application classification has been added, from a transmitter terminal; identifying, from approval request information in which the application classification and an approval request destination are made corresponding to each other, the approval request destination corresponding to the application classification added to the received E-mail; and transmitting an approval request to the identified approval request destination.

According to still another aspect of the present invention, there is provided a program stored in a computer-readable recording medium, for causing a computer to perform: a reception step of receiving an E-mail to which an application classification has been added, from a transmitter terminal; an identifying step of identifying, from approval request information in which the application classification and an approval request destination are made corresponding to each other, the approval request destination corresponding to the application classification added to the E-mail received in the reception step; and an approval request transmission step of transmitting an approval request to the approval request destination identified in the identifying step.

Further features of the present invention will become apparent from the following detailed description of the exemplary embodiments with reference to the attached drawings.

BRIEF DESCRIPTION OF THE DRAWINGS

The accompanying drawings, which are incorporated in and constitute a part of the specification, illustrate the exemplary embodiments of the present invention and, together with the description, serve to describe and explain the principle of the present invention.

FIG. 4 is a view indicating an example of a transmitter table.

FIG. 5 is a view indicating an example of an approver table.

FIG. 6 is a view indicating an example of an approval method table.

FIG. 7 is a view (part 1) indicating an example of an approval procedure table.

FIG. 11 is a view indicating an example of the application classification added to an E-mail.

FIG. 12 is a view (part 2) indicating an example of an approval procedure table.

FIG. 13 is a view indicating an example of a screen which includes a held mail list to be displayed by an approval/rejection instruction unit.

FIG. 16 is a view indicating an example of an approval procedure table which defined a logical relation.

FIG. 17 is a view indicating an example of an approval procedure table which defined an approval operation.

FIG. 24 is a view (part 1) indicating an example of a request destination table.

FIG. 25 is a view (part 2) indicating an example of a request destination table.

DESCRIPTION OF THE EMBODIMENTS

Hereinafter, the exemplary embodiments of the present invention will be described with reference to the attached drawings.

<First Embodiment>

Figure 1:
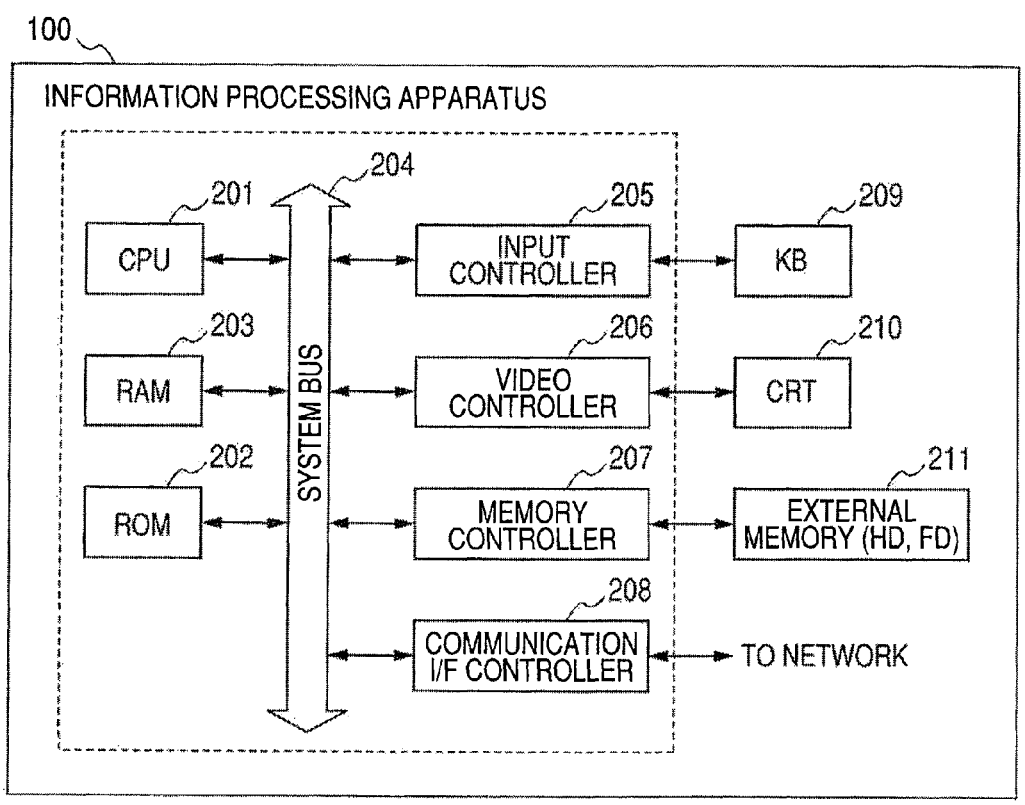
FIG. 1 is a view indicating an example of the hardware constitution of an information processing apparatus (computer) such as a transmitter terminal, an E-mail transmission/reception apparatus, a manager terminal or an approver terminal to be described later.

FIG. 1 is a view indicating an example of the hardware constitution of an information processing apparatus (computer) such as a transmitter terminal, an E-mail transmission/reception apparatus, a manager terminal or an approver terminal to be described later.

A CPU (central processing unit) 201 comprehensively controls each of the devices and controllers to be connected to a system bus 204. A BIOS (Basic Input/Output System) program, an operating system program (hereinafter, referred as an OS) and various programs concerning functions to be described later are stored in a ROM (read only memory) 202 or an external memory 211. A RAM (random access memory) 203 functions as a main memory, a work area and the like of the CPU 201. The CPU 201 realizes a function of each device (or terminal) or a process concerning a flowchart by executing the program upon loading the program required in executing the process to the RAM 203 from the ROM 202 or the external memory 211.

An input controller 205 controls signals input from a pointing device such as a keyboard 209 or a mouse (not illustrated). A video controller 206 controls a display operation to be performed to a display unit (display device) such as a CRT (cathode ray tube) display (CRT) 210 or the like. The display unit is not limited to the CRT but may be a liquid crystal display. A user of the information processing apparatus uses these items in accordance with necessity. A memory controller 207 controls an access to the external memory 211, which stores a boot program, the browser software, various application software, font data, user files, editing files and various data. A communication I/F (interface) controller 208, which performs the connection and communication operations with external devices through a network, executes a communication control process in the network. The communication I/F controller 208 can perform an internet communication of using, for example, a TCP/IP (Transmission Control Protocol/Internet Protocol). Note that the CPU 201 makes it possible to perform a display operation on the CRT 210 by executing, for example, a process of expanding (rasterizing) the outline font data to an area for the display information in the RAM 203. In addition, the CPU 201 makes it possible to perform a user instruction by a mouse cursor (not-illustrated) on the CRT 210.

Programs to realize the present embodiment are stored in the external memory 211, and the programs are executed by the CPU 201 by loading to the RAM 203 in accordance with necessity. In addition, definition files and various information tables to be used by the CPU 201 are stored in the external memory 211, and detailed description about these files and tables will be described later.

Figure 2:
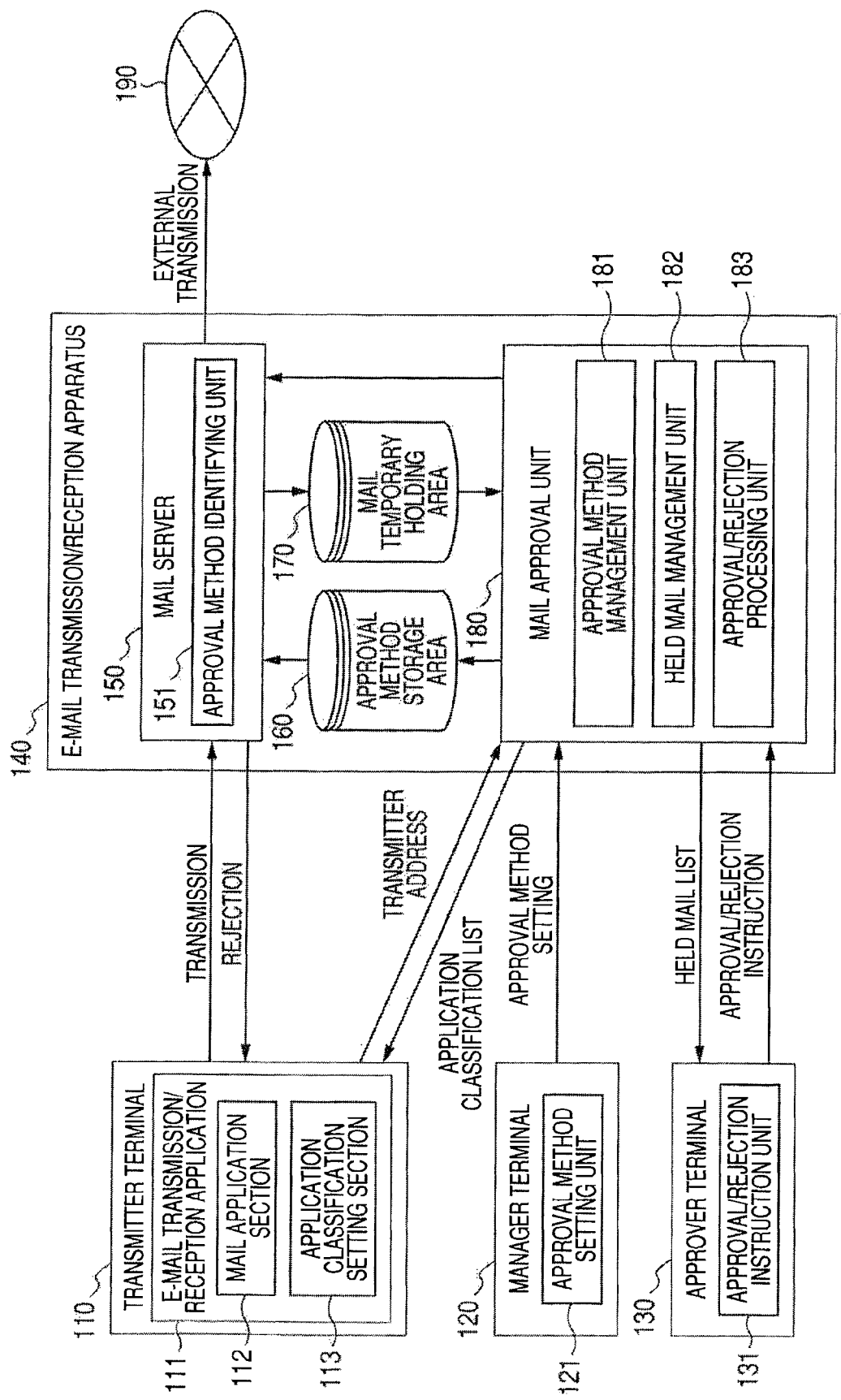
FIG. 2 is a view indicating an example of the system constitution of an information processing system and an example of the functional constitution of each device (terminal).

FIG. 2 is a view indicating an example of the system constitution of an information processing system and an example of the functional constitution of each device (terminal).

A transmitter terminal 110 is a terminal to be used by a user of performing an E-mail transmission and a transmission application. The transmitter terminal 110 can perform the transmission/reception of E-mails with an E-mail transmission/reception apparatus 140 through a network.

An E-mail transmission/reception application 111 has a function of general E-mail transmission/reception application software (so-called mailer software) and also has a mail application section 112 and an application classification setting section 113 as the functional constitution. For example, when activating the software, the E-mail transmission/reception application 111 acquires an application classification list corresponding to transmitters from the E-mail transmission/reception apparatus 140.

The E-mail transmission/reception application 111 may be implemented as a single program or a system of a web mail. Otherwise, the functions of the mail application section 112 and the application classification setting section 113 may be added to the existing E-mail transmission/reception application software as an add-in program.

The mail application section 112 transmits an E-mail to the E-mail transmission/reception apparatus 140 by adding the application classification to the E-mail created in the E-mail transmission/reception application 111.

The application classification setting section 113 sets the application classification to be added to the E-mail in response to an operating instruction of a transmitter (user).

A manager terminal 120 is a terminal to be used by a manager of setting an approval method of the E-mail.

An approval method setting unit 121 creates, changes and deletes an approval method set on the E-mail transmission/reception apparatus 140 through a network in response to an operating instruction of the manager.

An approver terminal 130 is a terminal to be used by an approver of approving the transmission of the E-mail.

An approval/rejection instruction unit 131 acquires a list of held E-mails from the E-mail transmission/reception apparatus 140 through a network and approves or rejects the transmission of the held E-mails in response to an operating instruction of the approver.

The E-mail transmission/reception apparatus 140, which is an example of an E-mail transmission control device, controls the approval/rejection of an E-mail applied to transmit and controls the transmission. The E-mail transmission/reception apparatus 140 can perform transmission/reception of E-mails with a network excepted from the organization (an external network 190).

A mail server 150 mediates transmission/reception of E-mails performed between the transmitter terminal 110 and the external network 190. The mail server 150 has an approval method identifying unit 151.

The approval method identifying unit 151 identifies the application classification added to an E-mail and an approval method corresponding to a transmitter for an E-mail transmitted from the mail server 150 from the approval method stored in an approval method storage area 160. Then, the approval method identifying unit 151 holds the E-mail in a mail temporary holding area 170 in accordance with the identified approval method. Note that the approval method storage area 160 or the mail temporary holding area 170 exists in the ROM of the E-mail transmission/reception apparatus 140 or an external memory.

Figure 3:
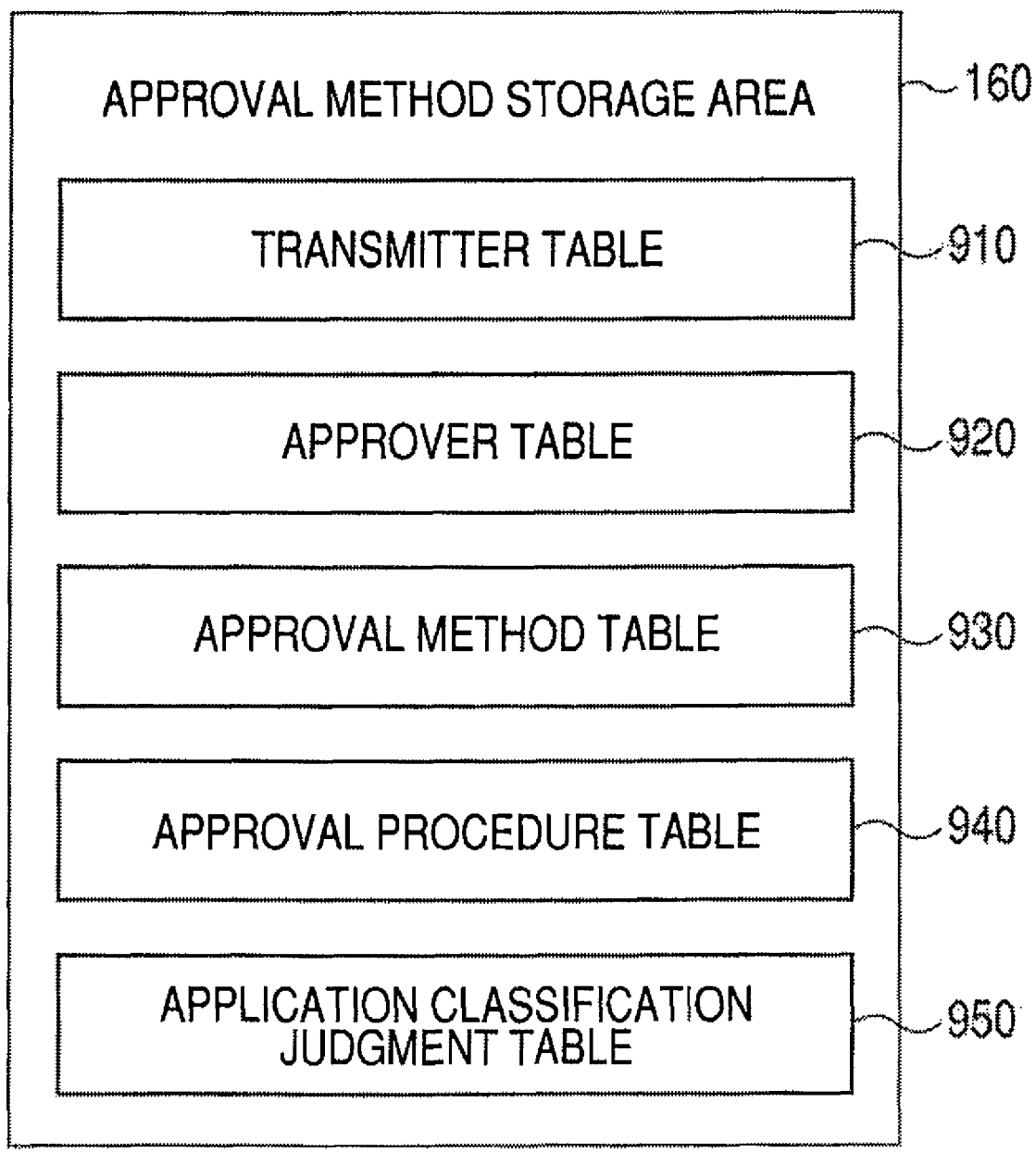
FIG. 3 is a view indicating an example of tables stored in an approval method storage area.

The approval method storage area 160 stores information about a transmitter (applicant), an approver, an approval method and the like. Here, an example of tables stored in the approval method storage area 160 will be indicated in FIG. 3. FIG. 3 is a view indicating an example of tables stored in the approval method storage area.

As indicated in FIG. 3, a transmitter table 910, an approver table 920, an approval method table 930 and an approval procedure table 940 are stored in the approval method storage area 160. Hereinafter, a specific example of each table will be indicated.

FIG. 4 is a view indicating an example of a transmitter table. As indicated in FIG. 4, staff names, organization information (organization and its hierarchy) and mail addresses are correspondingly set (or stored) in the transmitter table 910.

FIG. 5 is a view indicating an example of an approver table. As indicated in FIG. 5, approver names and posts of approvers in the organization constitution are correspondingly set (or stored) in the approver table 920.

FIG. 6 is a view indicating an example of an approval method table. As indicated in FIG. 6, an approval ID (approval identifier) for uniquely identifying the approval method, an approval organization (approval target) and the application classification are correspondingly set (or stored) in the approval method table 930. Like this, approval method information associated with the organization, the application classification and the approval identifier is stored in the approval method table.

FIG. 7 is a view (part 1) indicating an example of an approval procedure table. As indicated in FIG. 7, an approval ID for uniquely identifying an approval method, the order concerning the approval and approvers are set in the approval procedure table 940.

The description is returned to that in FIG. 2 again. E-mails are temporarily stored in the mail temporary holding area 170 until when unapproved E-mails are approved or rejected.

A mail approval unit 180 executes a process concerning the approval of E-mails held in the mail temporary holding area 170.

An approval method management unit 181 manages an approval method stored in the approval method storage area 160.

A held mail management unit 182 manages E-mails held in the mail temporary holding area 170. The held mail management unit 182 creates a held mail list used to display a list of targeted held mails by approvers in response to a request from the approval/rejection instruction unit 131.

An approval/rejection processing unit 183 executes a process corresponding to an instruction of the approval/rejection given by the approver.

Next, a process concerning an E-mail transmission approval in an information processing system will be described with reference to FIG. 8.

Figure 8:
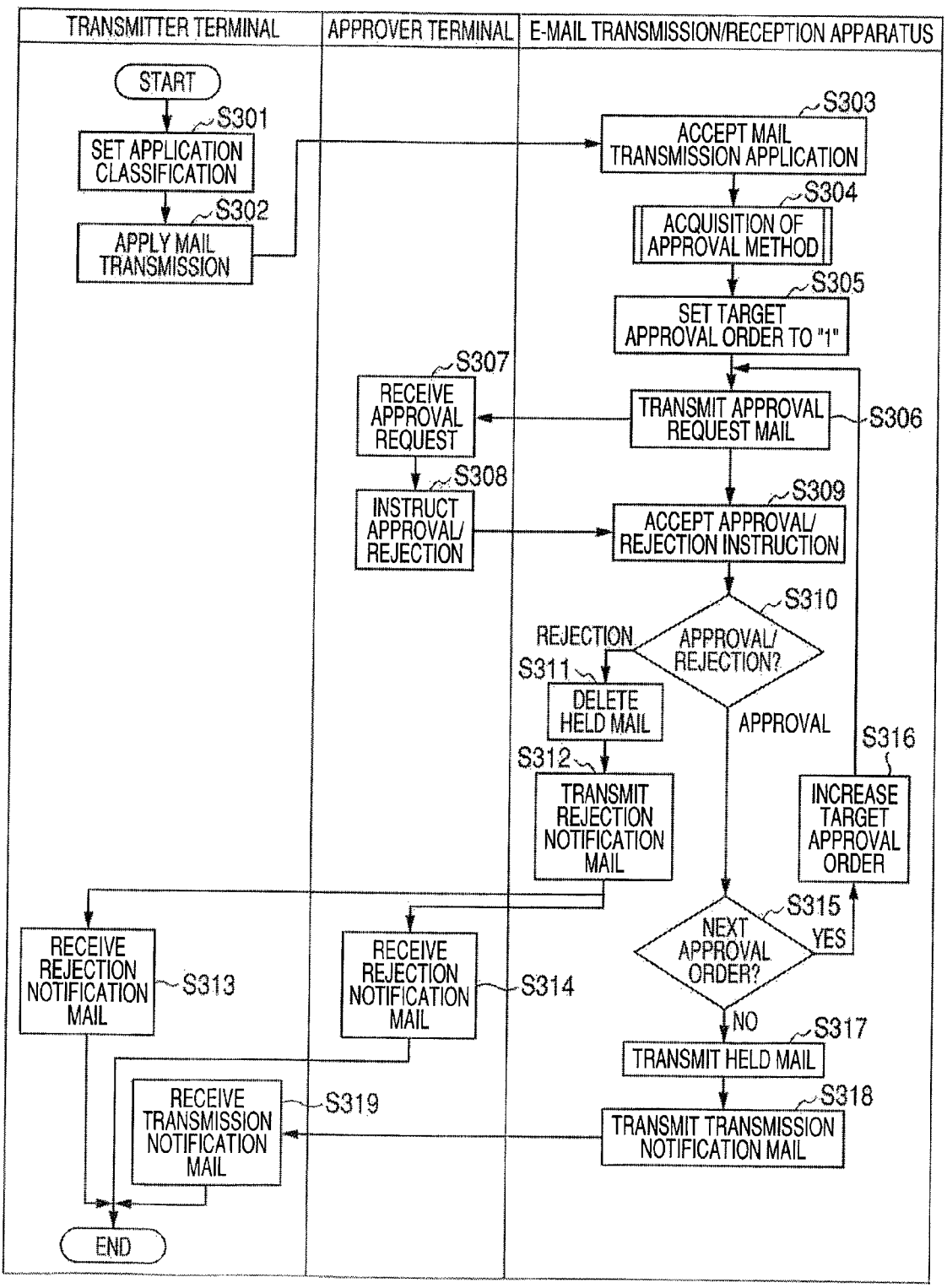
FIG. 8 is a view (part 1) indicating an example of a process concerning an E-mail transmission approval in the information processing system.

FIG. 8 is a view (part 1) indicating an example of a process concerning the E-mail transmission approval in the information processing system.

As described above, the transmitter terminal 110, the manager terminal 120, the approver terminal 130 and the E-mail transmission/reception apparatus 140 are mutually connected through a network. The transmitter terminal 110, the manager terminal 120 and the approver terminal 130 execute various processes concerning the approval of E-mail transmission to an external through various operation screens and the set information supplied from the E-mail transmission/reception apparatus 140. An example of the above description will be described below.

Figure 9:
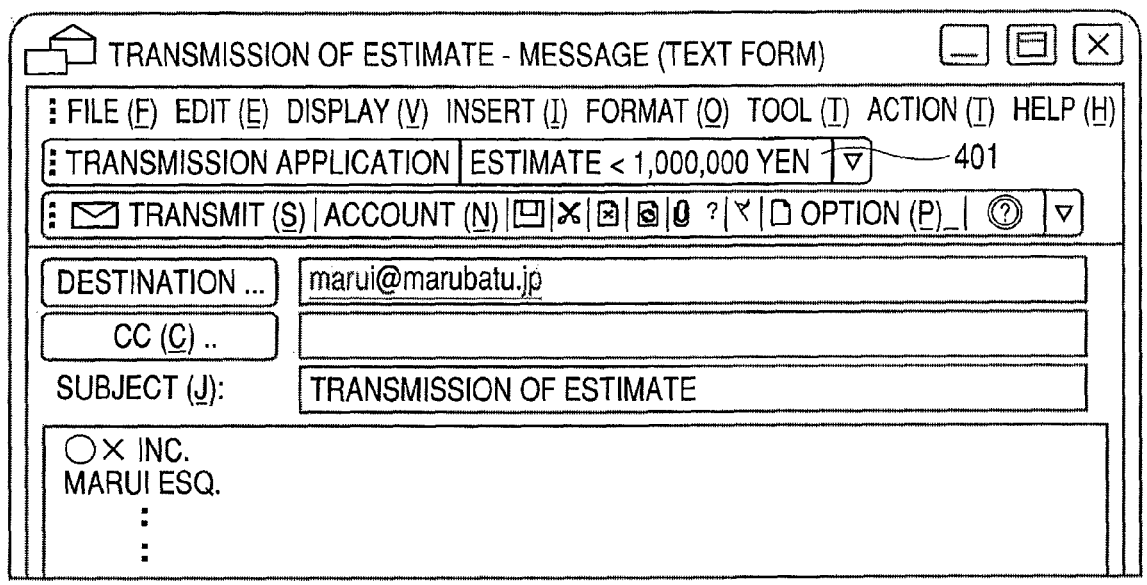
FIG. 9 is a view indicating an example of a screen of E-mail transmission/reception application 111.

Here, FIG. 9 is a view indicating an example of a screen of E-mail transmission/reception application 111. In the screen indicated in FIG. 9, a transmitter selects (or designates) an application designation section 401 and then designates the application classification of an E-mail by operating a keyboard or the like of the transmitter terminal 110.

Figure 10:
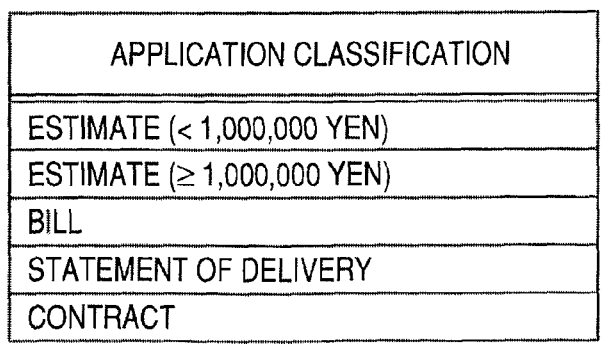
FIG. 10 is a view indicating an example of (a list of) the application classifications acquired from the E-mail transmission/reception apparatus by the E-mail transmission/reception application software.

The E-mail transmission/reception application 111 acquires (a list of) the application classifications, which can be applied by the transmitter, from the E-mail transmission/reception apparatus 140 at a time of activating and displays the acquired application classifications on the application designation section 401. The details about this process will be described in FIG. 4, which is to be described later. FIG. 10 is a view indicating an example of (a list of) the application classifications acquired from the E-mail transmission/reception apparatus by the E-mail transmission/reception application software.

In a step S301, the application classification setting section 113 sets the application classification to be added to a header of an E-mail in response to a selecting operation performed in the application designation section 401 by the transmitter.

In a step S302, the mail application section 112 adds the application classification which was set in the step S301 to the header of the E-mail and transmits this E-mail to the E-mail transmission/reception apparatus 140.

FIG. 11 is a view indicating an example of the application classification added to the E-mail. An application classification "Estimate (1,000,000 yen or more)" 602 is added in a field of "X-MailPurpose" in a header 601 of an E-mail indicated in FIG. 11. Note that although the application classification "Estimate (1,000,000 yen or more)" is described as it is in FIG. 11 in order to simplify the description, for example, the mail application section 112 may add the application classification to the header after encrypting the application classification in order to prevent the spoofing.

In a step S303, the mail server 150 receives the E-mail which was transmitted in step S302.

In a step S304, the approval method identifying unit 151 identifies (or acquires) an approval method corresponding to the application classification of the E-mail received in the step S303 and the transmitter.

In a case that the approval method could be acquired, the approval method identifying unit 151 stores the above-described E-mail in the mail temporary holding area 170. Meanwhile, in a case that the approval method can not be acquired, the approval method identifying unit 151 approves or rejects to transmit the E-mail in accordance with policy of the organization to which the transmitter belongs.

The details of a process of identifying the approval method will be described with reference to FIG. 15, which is to be described later.

In a step S305, the approval/rejection processing unit 183 sets the target approval order to "1".

In a step S306, the approval/rejection processing unit 183 transmits an approval request E-mail to an approver of performing an approval procedure, wherein the approval order (rank) (in the present embodiment, "rank" is also called "order" or "number") is equivalent to the target approval order in the procedures included in the approval method acquired in the step S304.

More specifically, in a case that the approval method acquired in the step S304 is an approval method of which an approval ID in the approval method table 930 indicated in FIG. 6 is 17, the approval/rejection processing unit 183 acquires two approval procedures 1301 of which the approval IDs in the approval procedure table 940 indicated in FIG. 7 are both 17. At this time, when it is assumed that the target approval order is "1", the approval/rejection processing unit 183 acquires a name of "IWARURA" as an approver. Then, the approval/rejection processing unit 183 acquires an address "iwamura@deko.jp" of "IWAMURA" (identification of an approval request destination) from the transmitter table 910 indicated in FIG. 4 and transmits an approval request mail (transmission of an approval request).

Here, another example of the approval procedure table 940 will be indicated in FIG. 12. FIG. 12 is a view (part 2) indicating an example of an approval procedure table. In a case that the approval method acquired in the step S304 is an approval method of which the approval ID in the approval method table 930 indicated in FIG. 6 is 17 and the approval procedure table 940 is such the table indicated in FIG. 12, the approval/rejection processing unit 183 acquires approval procedures 1401 of which the approval IDs are both 17. At this time, when it is assumed that the target approval order is "1", the approval/rejection processing unit 183 acquires "North America Project Division, Sales Department, Second Section, Section Manager" as an approver. Then, the approval/rejection processing unit 183 acquires the name of "IWAMURA" from the approver table 920 indicated in FIG. 5 and acquires the address "iwamura@deko.jp" of "IWAMURA" from the transmitter table 910 indicated in FIG. 4 and then transmits an approval request mail.

In a step S307, the approver terminal 130 receives the approval request E-mail, which was transmitted from the E-mail transmission/reception apparatus 140 in the step S306, and notifies the approver to perform the approval procedure.

In a step S308, the approval/rejection instruction unit 131 acquires a held mail list corresponding to the approvers from the held mail management unit 182. The approval/rejection instruction unit 131 displays the acquired held mail list and displays information of indicating that the held mails which are requested to be approved is in a state of waiting the approval. Here, FIG. 13 is a view indicating an example of a screen which includes a held mail list to be displayed by the approval/rejection instruction unit. The approval/rejection instruction unit 131 receives an approval/rejection instruction for the held mails (E-mails) which are requested to be approved by the applicants displayed through the screen as indicated in FIG. 13 and sends the received instruction to the approval/rejection processing unit 183 in the E-mail transmission/reception apparatus 140.

In a step S309, the approval/rejection processing unit 183 receives an instruction of the approver from the approver terminal 130.

In a step S310, the approval/rejection processing unit 183 judges the instruction received in the step S309 and branches the process in accordance with the instruction. The approval/rejection processing unit 183 shifts the process to a step S311 in a case that the instruction denotes the rejection and shifts the process to a step S315 in a case that the instruction denotes the approval.

In the step S311, the approval/rejection processing unit 183 deletes the E-mail instructed to be rejected in the step S309 from the mail temporary holding area 170.

In a step S312, the approval/rejection processing unit 183 transmits an E-mail (rejection notification mail), which notifies that a transmission of the E-mail was rejected, to a transmitter of the E-mail and an approver of instructed the rejection for a transmission application of the E-mail.

In a step S313, the transmitter terminal 110 receives the rejection notification mail transmitted in the step S312.

And, in a step S314, the approver terminal 130 receives the rejection notification mail transmitted in the step S312.

On the other hand, in the step S315, the approval/rejection processing unit 183 judges whether or not an approval procedure having a next approval order to the present target approval order is included in the approval method acquired in the step S304 and branches the process in accordance with the judgment. In a case that the approval procedure having a next approval order exists, since the approval procedure is still remaining, the approval/rejection processing unit 183 shifts the process to that in a step S316. In a case that the approval procedure having a next approval order does not exist, since all the approval procedures are performed, the approval/rejection processing unit 183 shifts the process to that in a step S317.

In the step S316, the approval/rejection processing unit 183 increases the target approval order by 1 and returns the process to the step S306 in order to execute the next order approval procedure.

On the other hand, in the step S317, the approval/rejection processing unit 183 deletes the description related to the application classification from a header of the E-mail stored in the mail temporary holding area 170 and delivers the above-described E-mail to the mail server 150. The mail server 150 transmits this E-mail to the external network 190.

In a step S318, the approval/rejection processing unit 183 transmits a transmission notification mail, which notifies that the E-mail was transmitted to the external, to the transmitter terminal 110.

In a step S319, the transmitter terminal 110 (the E-mail transmission/reception application 111) receives the transmission notification mail which was transmitted in the step S318 and terminates a transmission process for the E-mail.

Figure 14:
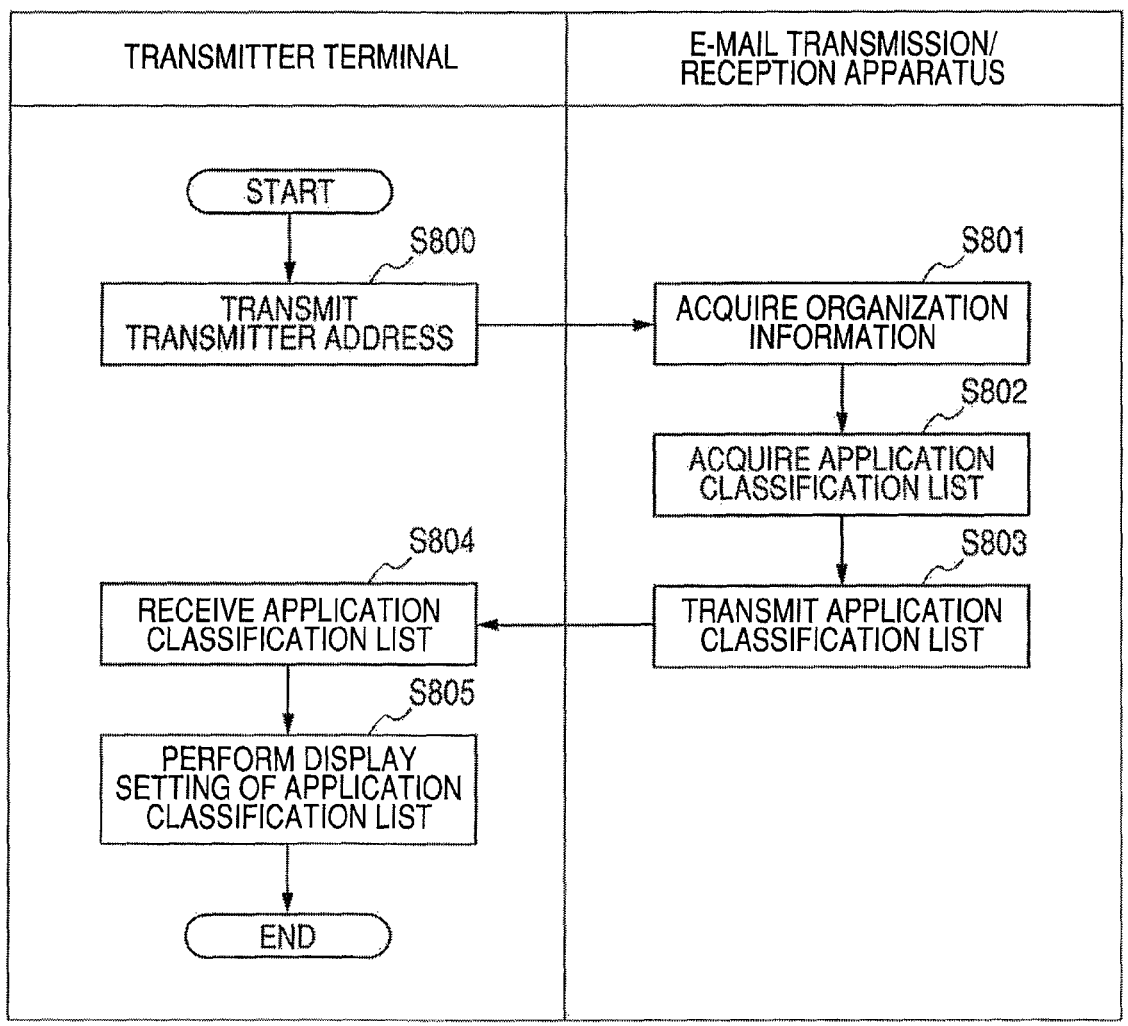
FIG. 14 is a view indicating an example of a process of acquiring and displaying an applicable application classification corresponding to a transmitter.

Next, a process of acquiring and displaying the application classification indicated in FIG. 9 will be described with reference to FIG. 14. FIG. 14 is a view indicating an example of a process of acquiring and displaying an applicable application classification corresponding to a transmitter. Note that this process is executed when the E-mail transmission/reception application 111 is activated.

In a step S800, the application classification setting section 113 transmits an E-mail address of the transmitter to the approval method management unit 181 of the E-mail transmission/reception apparatus 140.

In a step S801, the approval method management unit 181 acquires organization information corresponding to the transmitter mail address transmitted in the step S800 from the transmitter table 910 indicated in FIG. 4.

More specifically, in a case that an address "kuwata@deko.jp" is received as an address of the transmitter, the approval method management unit 181 acquires (identifies) information of {Group 1=North America Project Division, Group 2=Sales Department, Group 3=Second Section} as organization information corresponding to the address "kuwata@deko.jp" from the transmitter table 910.

In a step S802, the approval method management unit 181 acquires an application classification list in the organization, to which the transmitter belongs, from the approval method table 930 indicated in FIG. 6 for the organization information acquired in the step S801. The approval method management unit 181 also acquires the application classification set in the organization of which hierarchy is superior to the organization to which the transmitter belongs. However, in a case that the same application classification exists in different organizational hierarchies, the approval method management unit 181 prioritizes the application classification in the inferior hierarchy.

More specifically, in a case that the organization information is the information of {Group 1=North America Project Division, Group 2 Sales Department, Group 3=Second Section}, the approval method management unit 181 acquires an application classification 1201 of approval IDs 16 to 19 corresponding to the approval organization of "North America Project Division, Sales Department, Second Section" from the approval method table 930. In addition, the approval method management unit 181 also acquires an application classification 1202 of an approval ID 11 corresponding to the approval organization of "North America Project Division, Sales Department" of which hierarchy is superior to the approval organization of "North America Project Division, Sales Department, Second Section" from the approval method table 930. Furthermore, the approval method management unit 181 also acquires an application classification 1203 of an approval ID 1 corresponding to the approval organization of "North America Project Division" of which hierarchy is superior to the approval organization of "North America Project Division, Sales Department" from the approval method table 930. However, since the application classification of the approval method of the approval ID 1 is the same "Contract" as that of the approval method of the approval ID 11, the approval method management unit 181 does not add the application classification of the approval method of the approval ID 1 to an application classification list.

In a step S803, the approval method management unit 181 transmits an application classification list acquired in the step S802 to the application classification setting section 113 of the transmitter terminal 110.

In a step S804, the application classification setting section 113 receives the application classification list transmitted in the step S803.

In a step S805, the application classification setting section 113 sets the application classification list received in the step S804 in the application designation section 401 and displays the list.

Next, a process of acquiring the approval method in the step S304 will be described with reference to FIG. 15.

Figure 15:
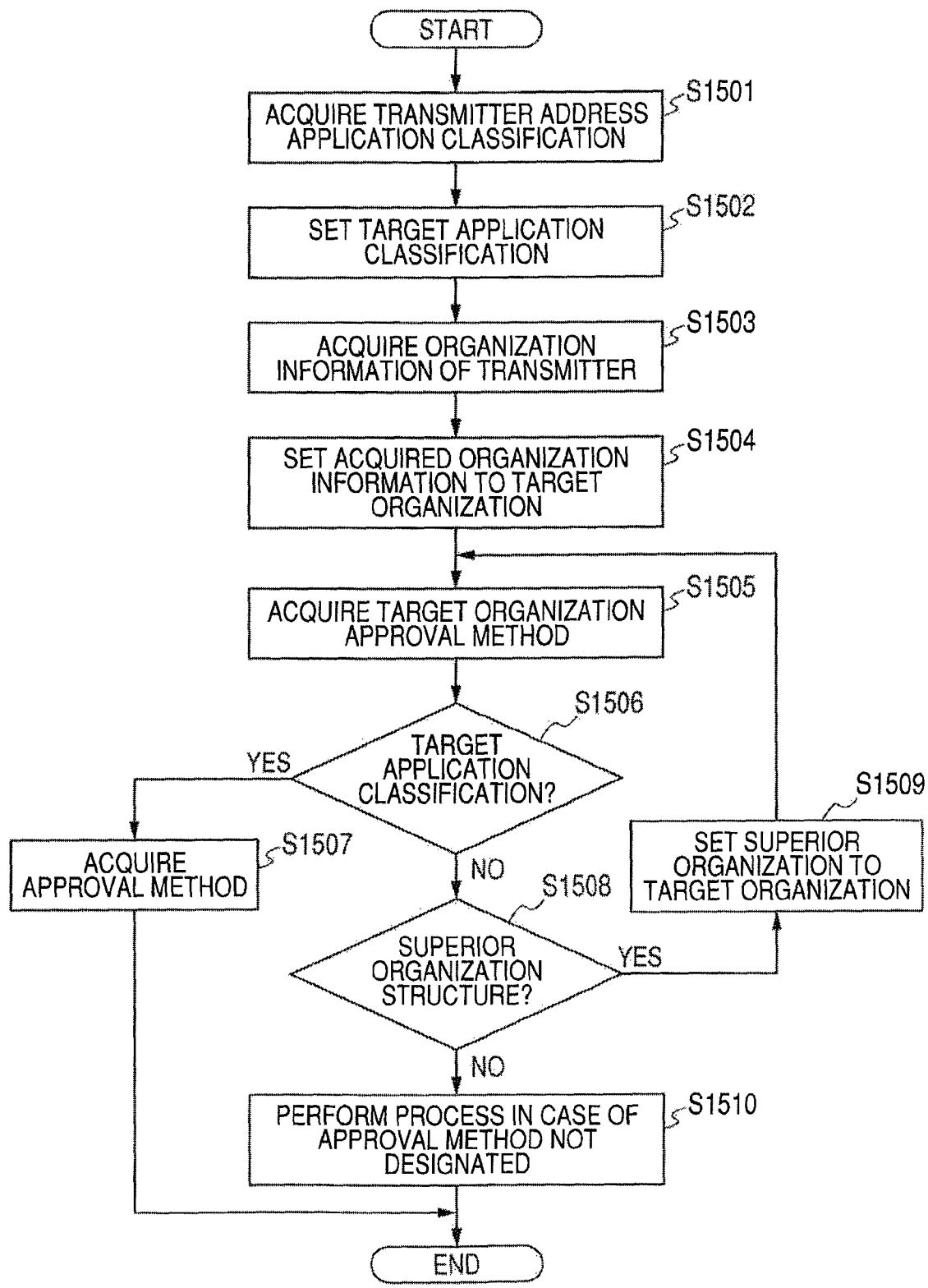
FIG. 15 is a flowchart indicating an example of a process of acquiring an approval method.

FIG. 15 is a flowchart indicating an example of a process of acquiring the approval method.

In a step S1501, the approval method identifying unit 151 acquires an address of the transmitter and the application classification from the E-mail received in the step S303.

In a step S1502, the approval method identifying unit 151 sets the acquired application classification in the target application classification. More specifically, in a case that the acquired application classification is the "Estimate (1,000,000 yen or more)", the approval method identifying unit 151 sets the "Estimate (1,000,000 yen or more)" in the target application classification.

In a step S1503, the approval method identifying unit 151 acquires the organization information corresponding to an address of the transmitter from the transmitter table 910 indicated in FIG. 4 (organization identifying). More specifically, in a case that an address of the transmitter is "kuwata@deko.jp", the approval method identifying unit 151 acquires the organization information of {Group 1=North America Project Division, Group 2=Sales Department, Group 3=Second Section} from the transmitter table 910.

In a step S1504, the approval method identifying unit 151 sets the organization information which was acquired in the step S1503 in the target organization. More specifically, in a case that the organization information which was acquired in the step S1503 is the organization information of {Group 1=North America Project Division, Group 2=Sales Department, Group 3=Second Section}, the target organization information also becomes the organization information of {Group 1=North America Project Division, Group 2=Sales Department, Group 3=Second Section}.

In a step S1505, the approval method identifying unit 151 acquires an approval method corresponding to the target organization set in the step S1504 from the approval method table 930 indicated in FIG. 6. More specifically, in a case that the target organization information is the organization information of {Group 1=North America Project Division, Group 2=Sales Department, Group 3=Second Section}, the approval method identifying unit 151 acquires the approval method of the approval IDs 16 to 19 of the approval organization which is the organization "North America Project Division, Sales Department, Second Section".

In a step S1506, the approval method identifying unit 151 confirms the presence or absence of an approval method which has the application classification equivalent to the target application classification from the approval method (approval ID) acquired in the step S1505. In a case that the approval method which has the application classification equivalent to the target application classification exists, the approval method identifying unit 151 shifts the process to a step S1507. In a case that the approval method which has the application classification equivalent to the target application classification does not exist, the approval method identifying unit 151 shifts the process to a step S1508.

In a case that the target application classification is the "Estimate (1,000,000 yen or more)", since the target application classification coincides with the application classification of the approval method of the approval ID 17 in the approval methods of the approval IDs 16 to 19 in an example of the approval method table 930 indicated in FIG. 6, the approval method identifying unit 151 shifts the process to the step S1507.

In the step S1507, the approval method identifying unit 151 acquires the approval method which has the application classification equivalent to the target application classification and terminates the process indicated in FIG. 15. In a case that the target application classification is the "Estimate (1,000,000 yen or more)", the approval method of the approval ID 17 is acquired as mentioned above in an example of the approval method table 930 indicated in FIG. 6 (approval identifier identification).

In the step S1508, the approval method identifying unit 151 confirms the presence or absence of the approval organization, of which hierarchy is one rank superior to the target organization, in the approval method table 930 indicated in FIG. 6. The approval method identifying unit 151 shifts the process to a step S1509 in a case that the superior approval organization exists and shifts the process to a step S1510 in a case that the superior approval organization does not exist.

In a case that the target organization information is the information of {Group 1=North America Project Division, Group 2=Sales Department, Group 3=Second Section}, since the organization of which information is the information of {Group 1=North America Project Division, Group 2=Sales Department} becomes the superior approval organization in the approval method table 930 indicated in FIG. 6, the process is shifted to the step S1509.

In the step S1509, the approval method identifying unit 151 sets the approval organization, of which hierarchy is one rank superior to the present target organization, to the target organization and returns the process to the step S1505. In a case that the present target organization information is the information of {Group 1=North America Project Division, Group 2=Sales Department, Group 3=Second Section}, the approval method identifying unit 151 sets, for example, the information of {Group 1=North America Project Division, Group 2=Sales Department} as a new target organization.

In the step S1510, the approval method identifying unit 151 executes a process when the approval method is not designated and terminates the process indicated in FIG. 15. As a process when the approval method is not designated, for example, the approval method identifying unit 151 approves or rejects a transmission of the E-mail in accordance with policy of the organization, to which the transmitter belongs, for the E-mail to which the approval method is not designated.

As described above, according to the present embodiment, the process is executed on the basis of the corresponded approval method by a manner that a transmitter only selects an application classification according to the contents of an E-mail to be transmitted. Accordingly, a complicated judgment of selecting an approver performed by the transmitter of the E-mail is not required, and it can be prevented to request the approval to an unsuitable approval destination. And, according to the present embodiment, also in a case that the organization or an approval rule is changed, a transmitter is not required to perform a complicated operation by a manner that a manager only resets an approval method for the application classification. In addition, according to the present embodiment, the approval by plural approvers can be realized. Furthermore, according to the present embodiment, different approval procedures or the order of approval procedures can be defined for the plural approvers.

<Second Embodiment>

FIG. 16 is a view indicating an example of an approval procedure table which defined a logical relation.

In the present embodiment, it is set that plural approvers can be defined for one approval procedure in the approval procedure table 940 and a logical disjunction (OR) or a logical conjunction (AND) of approval/rejection instructions by the plural approvers can be defined as the instruction of the approval procedure. In the present embodiment, a different point will be described as compared with the first embodiment.

In the step S309 indicated in FIG. 8 in the first embodiment, the approval/rejection processing unit 183 judges that the approval procedure was approved when the approval instructions of all the approvers were acquired in a case that the plural approvers are defined for the approval procedure and a relation of the approval procedure is in a state of "AND". On the other hand, the approval/rejection processing unit 183 judges that the approval procedure was rejected when a rejection instruction of either approver was acquired.

In addition, in the step S309 indicated in FIG. 8 in the first embodiment, the approval/rejection processing unit 183 judges that the approval procedure was approved when an approval instruction of either approver was acquired in a case that the plural approvers are defined for the approval procedure and a relation of the approval procedure is in a state of "OR". On the other hand, the approval/rejection processing unit 183 judges that the approval procedure was rejected when rejection instructions of all the approvers were acquired.

Although the logical relation is not concerned, in the step S309 indicated in FIG. 8 in the first embodiment, the approval/rejection processing unit 183 may judge that an initial approval instruction is a result of the approval procedure in a case that the plural approvers are defined for the approval procedure and a relation of the approval procedure is in a state of "FAST".

As described above, according to the present embodiment, a more complicated approval process can be defined and executed.

<Third Embodiment>

FIG. 17 is a view indicating an example of an approval procedure table which defined an approval operation. In the present embodiment, as an approval operation, "holding", "temporary holding" and "copy sending (information of notifying the copy sending)" can be set for the approval procedure in the approval procedure table 940. In a case that the "temporary holding" was set, the holding time also can be set. In the present embodiment, a different point will be described as compared with the above-described embodiment.

Figure 18:
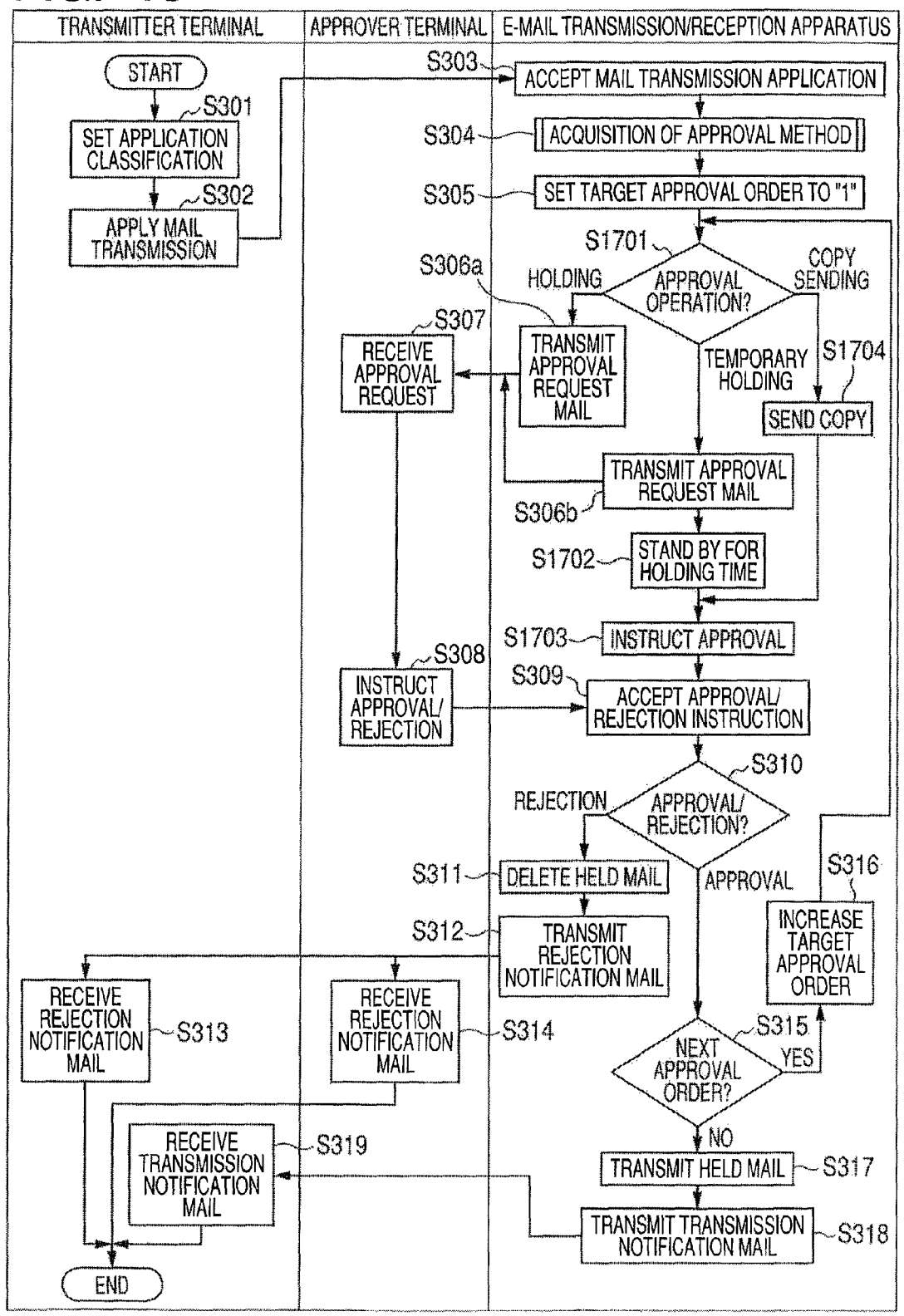
FIG. 18 is a view (part 2) indicating an example of a process concerning an E-mail transmission approval in the information processing system.

FIG. 18 is a view (part 2) indicating an example of a process concerning an E-mail transmission approval in the information processing system. In a case that a process is similar to that in the first embodiment indicated in FIG. 8, the same step number as that in the first embodiment is given also in FIG. 18. And, in a case that a process similar to that in FIG. 8 is described in two places or more due to the branch, an alphabetical lower-case character is added to a foot of the step number to discriminate. In FIG. 18, processes for the steps S306 to S309 in FIG. 8 which correspond to processes of the approval procedure are differed.

The processes in the steps S301 to S305 are the same as those in FIG. 8 in the first embodiment.

In a step S1701, the approval/rejection processing unit 183 shifts a process to a step S306a in a case that an approval operation of the approval procedure targeted to be processed is in a state of "holding". The approval/rejection processing unit 183 shifts the process to a step S306b in a case that the approval operation of the approval procedure targeted to be processed is in a state of "temporary holding". In addition, the approval/rejection processing unit 183 shifts the process to a step S1704 in a case that the approval operation of the approval procedure targeted to be processed is in a state of "copy sending".

In the step S306a, the approval/rejection processing unit 183 sends an approval request mail to an approver of performing the approval procedure targeted to be processed. Subsequent processes are the same as those in the first embodiment.

In the step S306b, the approval/rejection processing unit 183 sends the approval request mail to the approver of performing the approval procedure targeted to be processed and shifts the process to a step S1702 at the same time.

In the step S1702, the approval/rejection processing unit 183 measures an elapsed time after sending the approval request mail and stands by until the measured elapsed time exceeds the holding time defined in the approval procedure. The approval/rejection processing unit 183 advances the process to a step S1703 and transmits an approval instruction to the own unit in a case that an instruction of approval/rejection was not received from an approver terminal of the approver at a transmission destination to which the approval request mail was transmitted in the stand-by state. On the other hand, the approval/rejection processing unit 183 advances the process to the step S309 in a case that the instruction of approval/rejection was received from the approver terminal of the approver at the transmission destination to which the approval request mail was transmitted in the stand-by state.

In the step S1704, the approval/rejection processing unit 183 sends the approval request mail to the approver of performing the approval procedure targeted to be processed and sends the contents of the E-mail applied to be approved as a copy and then advances the process to the step S1703.

Processes in the steps S310 to S319 are the same as those in the first embodiment.

Hereinafter, the processes indicated in FIG. 18 will be described by using the approval procedure table 940 indicated in FIG. 17.

Similar to a case in the first embodiment, it is assumed that the approval/rejection processing unit 183 acquired the approval ID 17 in the processes up to the step S304.

In the step S305, the approval/rejection processing unit 183 sets the target approval order to "1".

In the step S1701, the approval/rejection processing unit 183 judges an approval operation of an approval procedure 1801 of which order is "1". Since the approval operation of the approval procedure 1801 is in a state of "holding", the approval/rejection processing unit 183 shifts the process to the step S306a.

In the step S306a, the approval/rejection processing unit 183 transmits an approval request mail to an approver "IWAMURA" acts as the approver of the approval procedure 1801.

In the step S307, the approver terminal 130 receives the approval request E-mail which was transmitted in the step S306a and sends a notification to, for example, the approver "IWAMURA" to perform the approval procedure.

In the step S308, the approval/rejection instruction unit 131 receives an instruction of approval/rejection by the approver "IWAMURA" for a held mail (E-mail) requested to be approved and sends the instruction to the approval/rejection processing unit 183 of the E-mail transmission/reception apparatus 140.

In the step S309, the approval/rejection processing unit 183 receives the instruction by the approver "IWAMURA".

In the step S310, the approval/rejection processing unit 183 judges the instruction by the approver "IWAMURA". In a case that the instruction by the approver "IWAMURA" was a rejection, the processes subsequent to the step S311 are executed similar to a case in the first embodiment. In a case that the instruction by the approver "IWAMURA" was an approval, the approval/rejection processing unit 183 shifts the process to the step S315.

In the step S315, the approval/rejection processing unit 183 judges that an approval procedure having a next approval order to the present target approval order "1" is included in the approval method (approval method of the approval ID 17) acquired in the step S304 and shifts the process to the step S316.

In the step S316, the approval/rejection processing unit 183 increases the target approval order to become the order "2".

In the step S1701, the approval/rejection processing unit 183 judges an approval operation of an approval procedure 1802 of which the order is "2". Since the approval operation of the approval procedure 1802 is in a state of "temporary holding", the approval/rejection processing unit 183 shifts the process to the step S306b.

In the step S306b, the approval/rejection processing unit 183 transmits an approval request mail to an approver "SUZUKI" acts as an approver of the approval procedure 1802 and shifts the process to the step S1702 at the same time.

In the step S307, the approver terminal 130 receives the approval request E-mail which was transmitted in the step S306b and sends a notification to, for example, the approver "SUZUKI" to perform the approval procedure.

In the step S308, the approval/rejection instruction unit 131 receives an instruction of approval/rejection by the approver "SUZUKI" for a held mail (E-mail) requested to be approved and sends the instruction to the approval/rejection processing unit 183 of the E-mail transmission/reception apparatus 140.

On the other hand, in the step S1702, the approval/rejection processing unit 183 stands by for an hour equivalent to the holding time of the approval procedure 1802. Then, the approval/rejection processing unit 183 executes the processes subsequent to the step S309 in a case that an instruction of approval/rejection was received from the approver terminal 130 during this stand-by time. On the other hand, the approval/rejection processing unit 183 shifts the process to the step S1703 in a case that the instruction of approval/rejection was not received from the approver terminal 130 during this stand-by time.

In the step S1703, the approval/rejection processing unit 183 transmits an approval instruction to the own unit 183 and advances the process to the step S309.

In the step S309, the approval/rejection processing unit 183 receives the instruction of approval/rejection from the approver terminal 130 or the approval instruction from the own unit 183. In the following, it will be described assuming that the instruction of approval/rejection was received from the approver terminal 130.

In the step S310, the approval/rejection processing unit 183 judges the instruction by the approver "SUZUKI". In a case that the instruction by the approver "SUZUKI" was a rejection, the processes subsequent to the step S311 are executed similar to a case in the first embodiment. In a case that the instruction by the approver "SUZUKI" was an approval, the approval/rejection processing unit 183 shifts the process to the step S315.

In the step S315, the approval/rejection processing unit 183 judges that an approval procedure having a next approval order to the present target approval order "2" is included in the approval method (approval method of the approval ID 17) acquired in the step S304 and shifts the process to the step S316.

In the step S316, the approval/rejection processing unit 183 increases the target approval order to become the order "3".

In the step S1701, the approval/rejection processing unit 183 judges an approval operation of an approval procedure 1803 of which the order is "3". Since the approval operation of the approval procedure 1803 is in a state of "copy sending", the approval/rejection processing unit 183 shifts the process to the step S1704.

In the step S1704, the approval/rejection processing unit 183 transmits an approval request mail to an approver "ENDO" acts as an approver of the approval procedure 1803 and sends the contents of an E-mail applied to be approved as a copy. Then, the approval/rejection processing unit 183 shifts the process to the step S1703 in a case that an instruction of approval/rejection was not received from the approver terminal 130.

In the step S1703, the approval/rejection processing unit 183 transmits an approval instruction to the own unit 183.

In the step S309, the approval/rejection processing unit 183 receives the instruction of approval/rejection from the approver terminal 130 or the approval instruction from the own unit 183. In the following, it will be described assuming that the instruction of approval/rejection was received from the approver terminal 130.

In the step S310, the approval/rejection processing unit 183 judges the instruction by the approver "ENDO". In a case that the instruction by the approver "ENDO" was a rejection, the processes subsequent to the step S311 are executed similar to a case in the first embodiment. In a case that the instruction by the approver "ENDO" was an approval, the approval/rejection processing unit 183 shifts the process to the step S315.

In the step S315, the approval/rejection processing unit 183 judges that an approval procedure having a next approval order to the present target approval order "3" is not included in the approval method (approval method of the approval ID 17) acquired in the step S304 and shifts the process to the step S317.

Processes subsequent to the step S317 are similar to those in the first embodiment.

As described above, according to the present embodiment, an approval operation or the holding time can be set, and a more flexible approval process can be executed.

<Fourth Embodiment>

In the present embodiment, a process, which automatically judges the application classification in accordance with the contents of an E-mail and identifies the application classification before the E-mail transmission/reception application 111 of the transmitter terminal 110 transmits the E-mail, will be described. In the present embodiment, a different point will be described as compared with the above-described embodiment.

Figure 19:
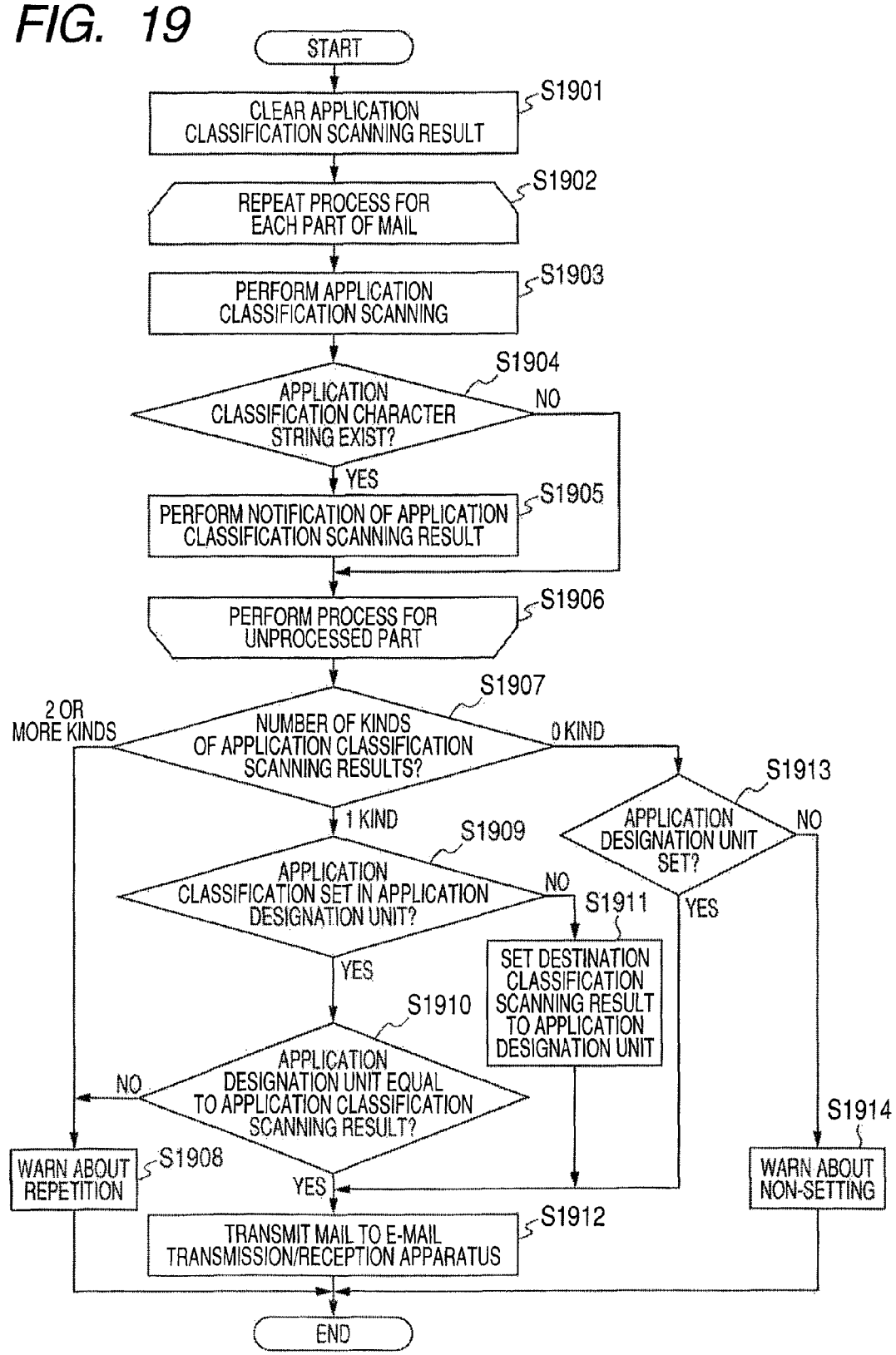
FIG. 19 is a flowchart indicating an example of a process of automatically judging the application classification of an E-mail by scanning the E-mail.

FIG. 19 is a flowchart indicating an example of a process of automatically judging the application classification of an E-mail by scanning the E-mail.

Figures 20, 21:
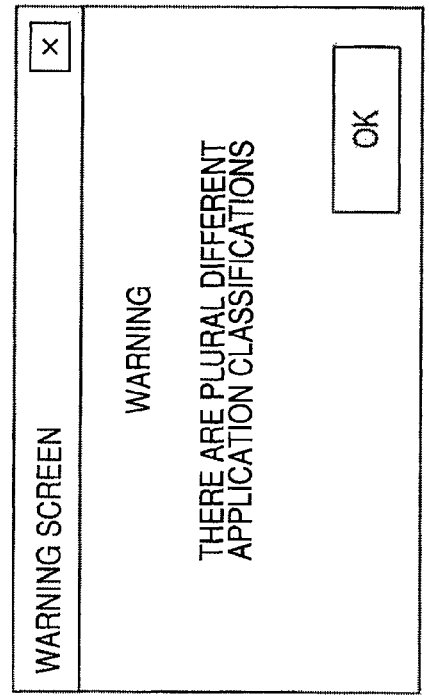
FIG. 20 is a view indicating an example of application classification judgment information to be used in judging the application classification of an E-mail.
FIG. 21 is a view (part 1) indicating an example of a warning screen.

FIG. 20 is a view indicating an example of an application classification judgment table which stores application classification judgment information to be used in judging the application classification of the E-mail. An application classification judgment table 950, which is stored in the approval method storage area 160, is acquired by the E-mail transmission/reception application 111 from the E-mail transmission/reception apparatus 140 at the same time of acquiring an application classification list when the E-mail transmission/reception application 111 is activated. Note that the mark "*" in FIG. 20 indicates "Estimation Amount" and a label-added cell in the spreadsheet software.

In a step S1901, the application classification setting section 113 clears an application classification scanning result area secured on a RAM of the transmitter terminal 110.

In a step S1902, the application classification setting section 113 starts a process to be repeatedly executed every part which constitutes an E-mail, about an E-mail intended to be transmitted by the E-mail transmission/reception application 111. It is assumed that the part is constituted by an E-mail subject, the body text, an attached file name and the attached file. The part mentioned in the present embodiment is different from that of a multipart mail according to the MIME (Multipurpose Internet Mail Extension) encoding. Note that an arbitrary location in the attached file of an E-mail described with a specific format is treated as the part and the application classification setting section 113 may execute a process indicated in the following. More specifically, the arbitrary location in the attached file of the E-mail described with a specific format is a specific cell of the spreadsheet software, a specific line in the word processor text, a backward of a specific character string or the like.

In a step S1903, the application classification setting section 113 scans the part of the E-mail and executes a process of detecting a portion coincided with an application classification character string (or pattern) defined in the application classification judgment table 950 (application classification identification).

In a step S1904, the application classification setting section 113 judges whether or not the application classification character string exists in the part targeted to be processed on the basis of a result of the detection process in the step S1903. The application classification setting section 113 shifts a process to a step S1905 in a case that the application classification character string exists in the part of an E-mail targeted to be processed and shifts the process to a step S1906 in a case that the application classification character string does not exist in the part of the E-mail targeted to be processed.

In the step S1905, the application classification setting section 113 adds the application classification defined in the application classification judgment table 950 to an application classification scanning result information on the RAM corresponding to the application classification character string detected in the step S1903.

In the step S1906, the application classification setting section 113 shifts the process to the step S1903 if the unprocessed part exists in order to process the unprocessed part and shifts the process to a step S1907 if the unprocessed part of the E-mail does not exist.

In the step S1907, the application classification setting section 113 branches the process depending on the number of kinds of the application classifications stored in the application classification scanning result information on the PAM.

The application classification setting section 113 shifts the process to a step S1908 in a case that two or more kinds of the application classifications are stored, shifts the process to a step S1909 in a case that one kind of the application classification is stored and shifts the process to a step S1913 in case that there is no kind of the application classification to be stored.

In the step S1908, the application classification setting section 113 outputs (displays) warning information as indicated in FIG. 21 informing that the E-mail includes the contents associated with two or more kinds of the application classifications on a screen of the transmitter terminal 110 and terminates the process indicated in FIG. 19. FIG. 21 is a view (part 1) indicating an example of a warning screen.

In the step s1909, the application classification setting section 113 judges whether or not the application classification is set (or selected) in the application designation section 401. In a case that the application classification is set in the application designation section 401, the process is shifted to a step S1910. In a case that the application classification is not set in the application designation section 401, the process is shifted to a step S1911.

In the step s1910, the application classification setting section 113 judges whether or not the application classification set in the application designation section 401 is equivalent to the application classification stored in the application classification scanning result information on the RAM. The application classification setting section 113 shifts the process to a step S1912 in a case that the above-described application classifications are equivalent each other and shifts the process to the step S1908 in a case that the above-described application classifications are not equivalent each other.

In the step S1911, the application classification setting section 113 sets the application classification, which is stored in the application classification scanning result information on the RAM, in the application designation section 401. At this time, the application classification setting section 113, for example, may emphasize a display of the application classification in the application designation section 401 indicated in FIG. 9 or change its color so that a transmitter can confirm that the application classification is set in the application designation section 401.

In the step S1912, the application classification setting section 113 transmits the E-mail to the E-mail transmission/reception apparatus 140 and terminates the process indicated in FIG. 19.

In the step S1913, the application classification setting section 113 judges whether or not the application classification is set in the application designation section 401. The application classification setting section 113 shifts the process to the step S1912 in a case that the application classification is set and shifts the process to a step S1914 in a case that the application classification is not set.

Figures 22, 23:
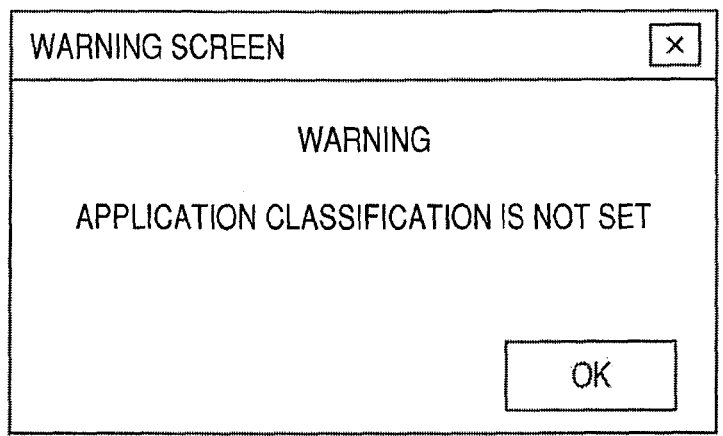
FIG. 22 is a view (part 2) indicating an example of a warning screen.
FIG. 23 is a view indicating an example of an E-mail.

In the step S1914, the warning information as indicated in FIG. 22 informing that the application classification is not set in the application designation section 401 is output (displayed) on a screen of the transmitter terminal 110 and the process indicated in FIG. 19 is terminated. FIG. 22 is a view (part 2) indicating an example of a warning screen.

Hereinafter, a judgment process of the application classification for an E-mail exemplified in FIG. 23 based on the application classification judgment table 950 indicated in FIG. 20 will be described by using a flowchart in FIG. 19. FIG. 23 is a view indicating an example of an E-mail.

In the step S1901, the application classification setting section 113 clears the application classification scanning result area secured on the RAM.

In the step S1902, the application classification setting section 113 selects a subject 2101 which is an initial part of the E-mail intended to be transmitted by the E-mail transmission/reception application 111.

In the step S1903, the application classification setting section 113 scans the subject 2101. However, the coincident application classification character string does not exist in the application classification judgment table 950 indicated in FIG. 20.

In the step S1904, the application classification setting section 113 shifts the process to the step S1906 because the coincident application classification character string did not exist.

In the step S1906, the application classification setting section 113 shifts the process to the step S1902 because the next part exists.

In the step S1902, the application classification setting section 113 selects a body text 2103 which is a next part of the E-mail intended to be transmitted by the E-mail transmission/reception application 111.

In the step S1903, the application classification setting section 113 scans the body text 2103. However, the coincident application classification character string does not exist in the application classification judgment table 950 indicated in FIG. 20.

In the step S1904, the application classification setting section 113 shifts the process to the step S1906 because the coincident application classification character string did not exist.

In the step S1906, the application classification setting section 113 shifts the process to the step S1902 because the next part exists.

In the step S1902, the application classification setting section 113 selects an attached file name 2104 of a first attached file which is a next part of the E-mail intended to be transmitted by the E-mail transmission/reception application 111.

In the step S1903, when the attached file name 2104 is scanned, the application classification setting section 113 acquires application classification judgment information 2001 having the coincident application classification character string in the application classification judgment table 950 indicated in FIG. 20.

In the step S1904, the application classification setting section 113 shifts the process to the step S1905 because the coincident application classification character string existed.

In the step S1905, the application classification setting section 113 adds information of "Bill" which is the application classification of the application classification judgment information 2001 to the application classification scanning result area secured on the RAM.

Since the application classification setting section 113 executes the process similarly in the following and acquires application classification judgment information 2002 for contents 2105 of the first attached file, the information of "Bill" is added to the application classification scanning result area secured on the RAM. And, since the coincident application classification character string does not exist for an attached file name 2106 of a second attached file, the application classification setting section 113 does not add anything.

Then, in the step S1902, the application classification setting section 113 selects contents 2107 of the second attached file. In the contents 1207 of the second attached file, it is assumed that reference numeral 2108 denotes an "Estimation Amount" label-added cell.

In this case, in the step S1903, the application classification setting section 113 acquires application classification judgment information 2003 having the coincident application classification character string in the application classification judgment table 950 indicated in FIG. 20 when scanning the contents 2107 of the attached file.

In the step S1904, the application classification setting section 113 shifts the process to the step S1905 because the coincident application classification character string existed.

In the step S1905, the application classification setting section 113 adds the "Estimate (1,000,000 yen or more)" which is the application classification of the application classification judgment information 2003 to the application classification scanning result area secured on the RAM.

In the step S1906, the application classification setting section 113 shifts the process to the step S1907 because a next part of the E-mail does not exist.

In the step S1907, the application classification setting section 113 shifts the process to the step S1908 because two kinds of the application classifications "Bill" and "Estimate (1,000,000 yen or more)" exist in the application classification scanning result area secured on the RAM.

In the step S1908, the application classification setting section 113 gives the warning informing that the contents of an E-mail intended to be transmitted corresponds to two or more kinds of the application classifications as indicated in FIG. 21 and terminates the process indicated in FIG. 19.

In the above-described example, in a case that the second attached file does not exist, in the step S1907, the application classification setting section 113 shifts the process to the step S1909 because only the one kind of the application classification "Bill" exists in the application classification scanning result area secured on the RAM.

In the step S1909, the application classification setting section 113 shifts the process to the step S1910 because the application classification "Estimate (1,000,000 yen or more)" is set in an application classification field 2102. Note that a selection result designated in the application designation section 401 is reflected in the application classification field 2102 indicated in FIG. 23.

In the step S1910, the application classification setting section 113 shifts the process to the step S1908 because the application classification scanning result information existing in the application classification scanning result area secured on the RAM is the application classification "Bill" and the application classification "Estimate (1,000,000 yen or more)" is set in the application classification field 2102.

In the step S1908, the application classification setting section 113 gives the warning informing that the contents of the E-mail intended to be transmitted corresponds to two or more kinds of the application classifications as indicated in FIG. 21 and terminates the process indicated in FIG. 19.

In the above-described example, in a case that the first attached file does not exist, in the step S1907, the application classification setting section 113 shifts the process to the step S1909 because only the one kind of the application classification "Estimate (1,000,000 yen or more)" exists in the application classification scanning result area secured on the RAM.

In the step S1909, the application classification setting section 113 shifts the process to the step S1910 because the application classification "Estimate (1,000,000 yen or more)" is set in the application classification field 2102.

In the step S1910, the application classification setting section 113 shifts the process to the step S1912 because the application classification scanning result information existing in the application classification scanning result area secured on the RAM is the application classification "Estimate (1,000,000 yen or more)" and the application classification "Estimate (1,000,000 yen or more)" is set in the application classification field 2102.

In the step S1912, the application classification setting section 113 transmits an E-mail to the E-mail transmission/reception apparatus 140 and terminates the process indicated in FIG. 19.

As described above, according to the present embodiment, since the application classification is automatically judged in accordance with a file name or the contents of the attached file, it can be prevented that plural documents of requiring different approval methods are mixed in one E-mail.

<Fifth Embodiment>

FIG. 24 is a view (part 1) indicating an example of a request destination table. In the present embodiment, an example of identifying an approval request destination (approver) by using an approval request destination table 960 which stores approval request information indicated in FIG. 24 instead of the approver table 920, the approval method table 930 and the approval procedure table 940 mentioned in the first embodiment will be described. It is assumed that the approval request destination table 960 is stored in the approval method storage area 160. In the present embodiment, the approval request information is one-record information, which includes, for example, the approval classification, an approval request destination (approver) and the order (approval order), stored (or memorized) in the approval request destination table 960.

In the present embodiment, a different point will be described as compared with the first embodiment.

In the step S304 indicated in FIG. 8 of the first embodiment, the approval/rejection processing unit 183 identifies an approval request destination (approver) corresponding to the application classification of the E-mail received in the step S303 from the approval request destination table 960 indicated in FIG. 24. The approval/rejection processing unit 183 can transmit the approval request to an identified approver also by executing the process in this manner.

<Sixth Embodiment>

FIG. 25 is a view (part 2) indicating an example of a request destination table. In the present embodiment, an example of identifying an approval request destination (approver) by using an approver table 970 which stores approval request information indicated in FIG. 25 instead of the approver table 920, the approval method table 930 and the approval procedure table 940 mentioned in the first embodiment will be described. It is assumed that the approval request destination table 960 is stored in the approval method storage area 160. In the present embodiment, the approval request information is one-record information, which includes, for example, an E-mail address of transmission source, the approval classification, the approval request destination (approver), the order (approval order), an approval operation and a holding time, stored (or memorized) in the approval request destination table 960.

In the present embodiment, a different point will be described as compared with the first embodiment.

In the step S304 indicated in FIG. 8 of the first embodiment, the approval/rejection processing unit 183 identifies an approval request destination (approver) corresponding to the application classification of the E-mail received in the step S303 and a mail address of the above-described E-mail from the approval request destination table 960 indicated in FIG. 25. The approval/rejection processing unit 183 can transmit the approval request to an identified approver also by executing the process in this manner.

More specifically, in a case that the application classification of the E-mail received in the step S303 was "Contract" and a mail address of transmission source of the above-described E-mail was "tanaka@*.co.jp" the approval/rejection processing unit 183 can identify two persons of "IWAMURA (section manager)" and "ENDO (section manager)" as the approval request destinations (approvers) from the approval request destination table 960 indicated in FIG. 25. In addition, the approval/rejection processing unit 183 can execute the process as indicated in FIG. 18** of the above-described third embodiment in accordance with the order as indicated in the above-described first embodiment or the approval operation and the holding time as indicated in the above-described third embodiment.

For example, in a case that the approval request destinations were the approvers "IWAMURA (section manager)" and "ENDO (section manager)", the application classification was "Contract" and the mail address of transmission source of the above-described E-mail was "tanaka@*.co.jp", the approval/rejection processing unit 183 identifies an approval operation of "holding" from the approval request destination table 960 indicated in FIG. 25. In addition, the approval/rejection processing unit 183 identifies that the order (approval order) of "IWAMURA (section manager)" is "1" and the order of "ENDO (section manager)" is "2" from the approval request destination table 960 indicated in FIG. 25. Therefore, the approval/rejection processing unit 183** firstly executes a process of requesting the approval to "IWAMURA (section manager)" and secondly executes a process of requesting the approval to "ENDO (section manager)".

As described above, according to the above-described embodiments, a complicated judgment of selecting an approver to be performed by an E-mail transmitter is not required and an approval request to an unsuitable approver can be prevented.

Note that the above-described embodiments may be performed upon arbitrarily combining.

As described above, although the preferable embodiments of the present invention have been described, the present invention is not limited to the related specific embodiments but various modifications and changes are possible within the scope of essence of the present invention described in the scope of the appended claims.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-340419, filed Dec. 28, 2007, which is hereby incorporated by reference herein in its entirety.

What is claimed is:

1. An information processing system which includes a transmitter terminal and an E-mail transmission control apparatus, wherein:
   the transmitter terminal comprises:
   a processor and a memory;
   a setting unit configured to set, based on a user operation for designating an application classification of an E-mail to be transmitted, the designated application classification to the E-mail;
   a transmission unit configured to transmit the E-mail to which the application classification set by the setting unit has been added, to the E-mail transmission control apparatus;
   an application classification identifying unit configured to automatically identify, from application classification judgment information in which a character string and the application classification are made corresponding to each other, the application classification corresponding to the character string included in the E-mail; and
   a warning unit configured to output warning information in a case where the application classification set by the setting unit and the application classification identified by the application classification identifying unit are different from each other; and
   the E-mail transmission control apparatus comprises:
   a processor and a memory;
   a reception unit configured to receive the E-mail to which the application classification set by the setting unit has been added, from the transmitter terminal;
   an identifying unit configured to identify, from approval request information in which the application classification and an approval request destination are made corresponding to each other, the approval request destination corresponding to the application classification added to the E-mail received by the reception unit; and
   an approval request transmission unit configured to transmit an approval request to the approval request destination identified by the identifying unit.

2. An information processing system according to claim 1, wherein the warning unit further outputs the warning information in a case where the application classification is not set by the setting unit and the application classification is not identified by the application classification identifying unit.

3. An information processing system according to claim 1, wherein the warning unit further outputs the warning information in a case where plural different application classifications are identified by the application classification identifying unit.

4. An information processing system according to claim 1, wherein the character string included in the E-mail is a character string included in a body text of the E-mail and/or data of an attached file of the E-mail.

5. An information processing system according to claim 1, wherein:
   the application classification, the approval request destination and approval order are made corresponding to others in the approval request information,
   the identifying unit identifies, according to the approval order, the approval request destination corresponding to the application classification added to the E-mail received by the reception unit, and
   the approval request transmission unit transmits the approval request to the approval request destination in order identified by the identifying unit.

6. An information processing system according to claim 1, wherein the E-mail transmission control apparatus further comprises:

a timer configured to measure an elapsed time from the transmission of the approval request to the approval request destination by the approval request transmission unit; and an approval unit configured to approve the transmission of the E-mail in a case where the elapsed time measured by the timer exceeds a set holding time.

7. An information processing system according to claim 1, wherein:

the application classification, the approval request destination and an approval operation are made corresponding to others in the approval request information, the identifying unit identifies the approval request destination and the approval operation corresponding to the application classification added to the E-mail received by the reception unit, and in a case where information indicating transmission of a copy of the E-mail has been set to the approval operation identified by the identifying unit, the approval request transmission unit transmits the copy of the E-mail as well as the approval request to the approval request destination.

8. An information processing method in an information processing system which includes a transmitter terminal and an E-mail transmission control apparatus, wherein:

in the transmitter terminal, the information processing method comprising:

setting, based on a user operation for designating an application classification of an E-mail to be transmitted, the designated application classification to the E-mail;

transmitting the E-mail to which the set application classification has been added, to the E-mail transmission control apparatus;

an application classification identifying step of automatically identifying, from application classification judgment information in which a character string and the application classification are made corresponding to each other, the application classification corresponding to the character string included in the E-mail; and a warning step of outputting warning information in a case where the application classification set by the setting step and the application classification identified by the application classification identifying step are different from each other; and in the E-mail transmission control apparatus, the information processing method comprising:

receiving the E-mail to which the application classification set by the setting step has been added, from the transmitter terminal;

identifying, from approval request information in which the application classification and an approval request destination are made corresponding to each other, the approval request destination corresponding to the application classification added to the received E-mail; and transmitting an approval request to the identified approval request destination.

* * * * *